US011875334B2

(12) United States Patent
Yamada

(10) Patent No.: US 11,875,334 B2
(45) Date of Patent: Jan. 16, 2024

(54) INFORMATION PROCESSING APPARATUS, INFORMATION PROCESSING SYSTEM, INFORMATION PROCESSING METHOD, AND PROGRAM

(71) Applicant: GURUNAVI, Inc., Tokyo (JP)

(72) Inventor: Atsushi Yamada, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 219 days.

(21) Appl. No.: 16/754,498

(22) PCT Filed: Dec. 28, 2017

(86) PCT No.: PCT/JP2017/047338
§ 371 (c)(1),
(2) Date: Apr. 8, 2020

(87) PCT Pub. No.: WO2019/130574
PCT Pub. Date: Jul. 4, 2019

(65) Prior Publication Data
US 2020/0342440 A1 Oct. 29, 2020

(51) Int. Cl.
*G06Q 20/32* (2012.01)
*G06Q 20/20* (2012.01)
*G06Q 20/40* (2012.01)

(52) U.S. Cl.
CPC ....... *G06Q 20/3274* (2013.01); *G06Q 20/206* (2013.01); *G06Q 20/326* (2020.05); *G06Q 20/4014* (2013.01)

(58) Field of Classification Search
None
See application file for complete search history.

(56) References Cited

U.S. PATENT DOCUMENTS 10,380,583 B1 * 8/2019 Ellis ..................... G06Q 20/322
11,410,161 B1 * 8/2022 Kurani ................. G06Q 20/352
(Continued)

FOREIGN PATENT DOCUMENTS

JP 2001344545 A 12/2001
JP 2007299316 A 11/2007
(Continued)

OTHER PUBLICATIONS

"Recordon, David, OpenID 2.0: A Platform for User-Centric Identity Management", 2006, VeriSign Inc, pp. 11-15 (Year: 2006).*
(Continued)

*Primary Examiner* — Neha Patel
*Assistant Examiner* — Nicholas K Phan
(74) *Attorney, Agent, or Firm* — Alleman Hall Creasman & Tuttle LLP

(57) ABSTRACT

An information processing apparatus, an information processing system, an information processing method, and a program capable of improving a convenience of a user in an information code payment. A shop terminal includes: an authentication information acquiring unit configured to acquire authentication information corresponding to a user terminal; an authentication information transmitting unit configured to transmit the authentication information acquired by the authentication information acquiring unit to a plurality of payment apparatuses; and an authentication result acquiring unit configured to acquire an authentication result for the authentication information from at least one of the plurality of payment apparatuses.

18 Claims, 13 Drawing Sheets

(56) References Cited

U.S. PATENT DOCUMENTS

| | | | | |
|---|---|---|---|---|
| 11,429,947 | B2 * | 8/2022 | Poole | G06Q 20/425 |
| 2001/0051915 | A1 | 12/2001 | Jeno et al. | |
| 2015/0220914 | A1 * | 8/2015 | Purves | G06Q 30/0633 705/41 |
| 2016/0048828 | A1 * | 2/2016 | Lee | G06Q 20/401 705/39 |
| 2017/0339151 | A1 * | 11/2017 | Van Os | G06Q 20/12 |
| 2018/0225737 | A1 * | 8/2018 | Krishan | G06Q 10/083 |
| 2019/0122206 | A1 * | 4/2019 | Yen | G06Q 20/36 |
| 2019/0228399 | A1 * | 7/2019 | Molnar | G06Q 20/425 |

FOREIGN PATENT DOCUMENTS

| | | | |
|---|---|---|---|
| JP | 20120190433 | A | 10/2012 |
| KR | 20110114282 | A | 10/2011 |
| KR | 20170089174 | A | 8/2017 |
| WO | 2007129581 | A1 | 11/2007 |

OTHER PUBLICATIONS

ISA European Patent Office, International Search Report Issued in Application No. PCT/JP2017/047338, dated Mar. 20, 2018, WIPO, 17 pages.

Korean Intellectual Property Office, Office Action Issued in Application No. 10-2020-7009868, dated Feb. 28, 2022, Korea, 13 Pages.

* cited by examiner

FIG. 5

| PAYMENT COMPANY | PAYMENT APPARATUS | IDENTIFICATION INFORMATION | PAYMENT SYSTEM | ACCESS INFORMATION |
|---|---|---|---|---|
| A | 3A | pay.id_a | S1 | url.3a |
| B | 3B | pay.id_b | S2 | url.3b |
| C | 3C | pay.id_c | S3 | url.3c |
| ... | ... | ... | ... | ... |

FIG. 6

| USER | USER ID | PAYMENT INFORMATION | QR CODE ISSUANCE STATE |
|---|---|---|---|
| X | user.x | CREDIT CARD CR1 | ISSUED |
| Y | user.y | CREDIT CARD CR2 | NOT ISSUED |
| Z | user.z | CREDIT CARD CR3 | NOT ISSUED |
| ... | ... | ... | ... |

FIG. 10

| USER | USER ID | PAYMENT COMPANY | USE DATE | USED AMOUNT |
|---|---|---|---|---|
| X | user.x | A | 2017/08/10 | 52,000YEN |
| X | user.x | B | 2016/02/30 | 5,500YEN |
| X | user.x | A | 2017/10/15 | 65,000YEN |
| X | user.x | A | 2017/01/10 | 52,000YEN |
| X | user.x | B | 2016/06/20 | 3,000YEN |
| X | user.x | C | 2017/12/05 | 11,000YEN |
| X | user.x | C | 2017/11/25 | 38,000YEN |

FIG. 11

| PRIORITY | PAYMENT COMPANY | PAYMENT APPARATUS | IDENTIFICATION INFORMATION | PAYMENT SYSTEM | ACCESS INFORMATION |
|---|---|---|---|---|---|
| 1 | B | 3B | pay.id_b | S2 | url.3b |
| 2 | C | 3C | pay.id_c | S3 | url.3c |
| 3 | A | 3A | pay.id_a | S1 | url.3a |

FIG. 12

| PRIORITY | PAYMENT COMPANY | PAYMENT APPARATUS | IDENTIFICATION INFORMATION | PAYMENT SYSTEM | ACCESS INFORMATION |
|---|---|---|---|---|---|
| 1 | C | 3C | pay.id_c | S3 | url.3c |
| 2 | A | 3A | pay.id_a | S1 | url.3a |
| 3 | B | 3B | pay.id_b | S2 | url.3b |

FIG. 13

| REGION | PAYMENT COMPANY | PAYMENT APPARATUS | IDENTIFICATION INFORMATION | PAYMENT SYSTEM | ACCESS INFORMATION |
|---|---|---|---|---|---|
| KANTO | A | 3A | pay.id_a | S1 | url.3a |
| CHUBU | B | 3B | pay.id_b | S2 | url.3b |
| KANSAI | C | 3C | pay.id_c | S3 | url.3c |

FIG. 14

| COMMUNICATION SPEED | PAYMENT COMPANY | PAYMENT APPARATUS | IDENTIFICATION INFORMATION | PAYMENT SYSTEM | ACCESS INFORMATION |
|---|---|---|---|---|---|
| LOW | A | 3A | pay.id_a | S1 | url.3a |
| HIGH | B | 3B | pay.id_b | S2 | url.3b |
| MIDDLE | C | 3C | pay.id_c | S3 | url.3c |

INFORMATION PROCESSING APPARATUS, INFORMATION PROCESSING SYSTEM, INFORMATION PROCESSING METHOD, AND PROGRAM

TECHNICAL FIELD

The present invention relates to an information processing apparatus, an information processing system, an information processing method, and a program.

BACKGROUND ART

In recent years, a payment system using a two-dimensional code (QR code (registered trademark)) has been proposed. For example, a user terminal (for example, a mobile terminal) reads a two-dimensional code output from a shop terminal, acquires a shop ID and a bill for a product included in the two-dimensional code, and completes a payment process based on a payment request that includes the shop ID, the bill, and a user ID (see, for example, PTL 1).

In addition, a payment system has been proposed in which a shop terminal reads a two-dimensional code displayed on a user terminal, and completes a payment process based on a payment request that includes information of a user ID, a shop ID, and a bill that are included in the two-dimensional code.

CITATION LIST

Patent Literature

[PTL 1] Japanese Patent Application Publication No. 2007-299316

SUMMARY OF THE INVENTION

Problems to be Solved by the Invention

However, according to the above-mentioned payment system, a user is registered with, in advance, a payment system of a payment company (payment site) that can be used at a shop, and uses a two-dimensional code issued by the payment company to make a two-dimensional code payment at the shop. As a result, the user cannot use the two-dimensional code payment at a shop that uses a payment service that is different from the payment service of the payment company with which the user has been registered. In addition, to use two-dimensional code payments at multiple shops, the user needs to be registered with a plurality of payment systems of a plurality of payment companies. This is inconvenient for the user.

An object of the present invention is to provide an information processing apparatus, an information processing system, an information processing method, and a program capable of improving a convenience of a user in an information code payment.

Solution to the Problems

A first aspect of the present invention relates to an information processing apparatus including: an authentication information acquiring unit configured to acquire authentication information corresponding to a first terminal; an authentication information transmitting unit configured to transmit the authentication information acquired by the authentication information acquiring unit to a plurality of payment apparatuses; and an authentication result acquiring unit configured to acquire an authentication result for the authentication information from at least one of the plurality of payment apparatuses.

A second aspect of the present invention relates to an information processing method: acquiring authentication information corresponding to a first terminal; transmitting the acquired authentication information to a plurality of payment apparatuses; and acquiring an authentication result for the authentication information from at least one of the plurality of payment apparatuses.

A third aspect of the present invention relates to a program for causing a computer to execute: a step of acquiring authentication information corresponding to a first terminal; a step of transmitting the acquired authentication information to a plurality of payment apparatuses; and a step of acquiring an authentication result for the authentication information from at least one of the plurality of payment apparatuses.

A fourth aspect of the present invention relates to an information processing system including a first terminal and a second terminal, the first terminal configured to display an information code, the second terminal configured to read the information code, the information processing system including: a position information acquiring unit configured to acquire first position information and second position information, the first position information indicating a position of the first terminal, the second position information indicating a position of the second terminal; an authentication information acquiring unit configured to acquire authentication information corresponding to the first terminal; an authentication information transmitting unit configured to transmit the authentication information acquired by the authentication information acquiring unit to a plurality of payment apparatuses; and an authentication processing unit configured to perform an authentication of a user based on the first position information and the second position information.

Effects of the Invention

The above aspects of the present invention provide an information processing apparatus, an information processing system, an information processing method, and a program capable of improving a convenience of a user in an information code payment.

BRIEF DESCRIPTION OF THE DRAWINGS

FIG. 5 is a diagram showing an example of information of payment apparatuses used in the information processing system according to an embodiment of the present invention.

FIG. 6 is a diagram showing an example of payment information of users used in the information processing system according to an embodiment of the present invention.

FIG. 10 is a diagram showing an example of a use history of a user used in the information processing system according to an embodiment of the present invention.

FIG. 11 is a diagram showing an example of priorities of payment apparatuses used in the information processing system according to an embodiment of the present invention.

FIG. 12 is a diagram showing an example of priorities of the payment apparatuses used in the information processing system according to an embodiment of the present invention.

FIG. 13 is a diagram showing an example of information of the payment apparatuses used in the information processing system according to an embodiment of the present invention.

FIG. 14 is a diagram showing an example of information of the payment apparatuses used in the information processing system according to an embodiment of the present invention.

DETAILED DESCRIPTION OF EMBODIMENTS

The following describes embodiments of the present invention with reference to the accompanying drawings for the understanding of the present invention. It should be noted that the following embodiments are examples of specific embodiments of the present invention and should not limit the technical scope of the present invention.

[Information Processing System 100]

The following describes an example case where a first terminal according to the present invention is a user terminal, and an information processing apparatus and a second terminal are shop terminals. Another example case is described below in which the first terminal is a shop terminal, and the information processing apparatus and the second terminal are user terminals. It is noted that the first terminal, the information processing apparatus, and the second terminal are included in the scope of the present invention regardless of whether they are user terminals or shop terminals.

Figure 1:
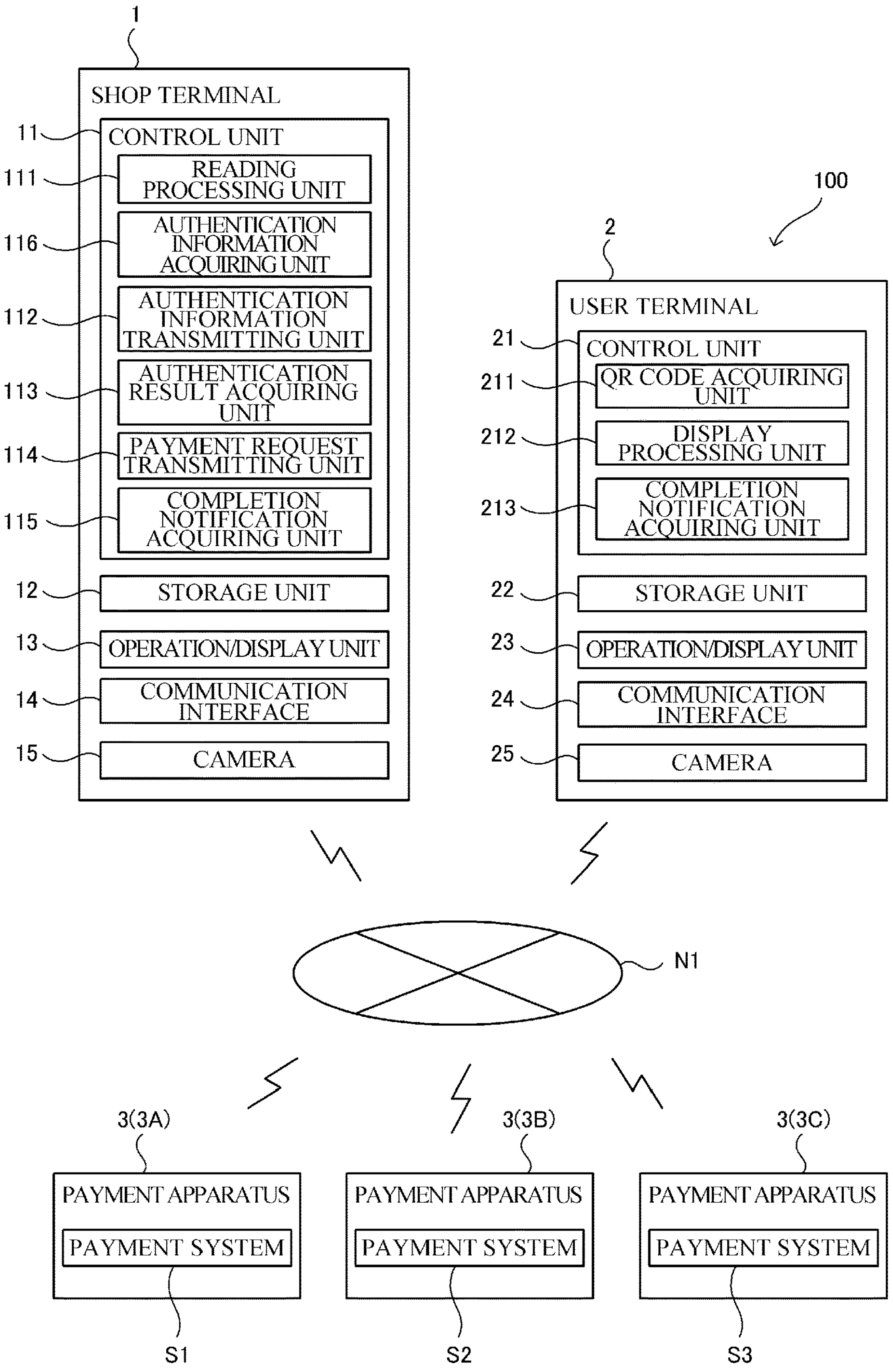
FIG. 1 is a block diagram showing a configuration of an information processing system according to an embodiment of the present invention.

As shown in FIG. 1, the information processing system 100 of an embodiment (Embodiment 1) of the present invention includes a shop terminal 1 (the information processing apparatus, the second terminal), a user terminal 2 (the first terminal), and a plurality of payment apparatuses 3. The shop terminal 1, the user terminal 2, and the plurality of payment apparatuses 3 are configured to communicate with each other via a communication network N1 that is, for example, the Internet, a LAN, a WAN, or a public telephone line. It is noted that there may be provided a plurality of shop terminals 1 or a plurality of user terminals 2. The plurality of payment apparatuses 3 (3A, 3B, 3C, . . . ) are apparatuses (for example, management servers) managed by different payment companies. Different payment systems S (S1, S2, S3, . . . ) are respectively installed in the plurality of payment apparatuses 3. In the following description, three payment apparatuses 3A, 3B, and 3C are described as an example. It is noted that when one of the three payment apparatuses 3A, 3B, and 3C is described as a representative, the payment apparatus is referred to as a payment apparatus 3.

The following describes an example of an outline of the information processing system 100 according to an embodiment of the present invention.

First, the user concludes a service contract with a desired payment company in advance, and installs an exclusive payment application onto the user terminal 2 from a payment site (the payment apparatus 3) managed by the payment company. This allows the user to use the payment application to use a payment system S of the payment company.

Next, when, for example, buying a product at a shop, the user activates (logs in) the payment application, acquires an information code (hereinafter referred to as a "QR code") issued from the payment site, and causes the shop terminal 1 to read the QR code. The shop terminal 1 transmits authentication information to each of the payment apparatuses 3A, 3B, and 3C, wherein the authentication information includes user information (user ID) included in the QR code and shop information (shop ID). Each of the payment apparatuses 3A, 3B, and 3C executes an authentication process to authenticate the user based on the user ID.

Next, the shop terminal 1 transmits a payment request that includes information of a bill for the product to one of the payment apparatuses 3A, 3B, and 3C that has successfully authenticated the user. The payment apparatus 3 that has received the payment request, executes the payment process.

Here, a description is given of a QR code C1 (see FIG. 3) that is used in the information processing system 100. It is noted that the information code used in the present invention includes a one-dimensional code, a two-dimensional code or the like.

Figure 2:
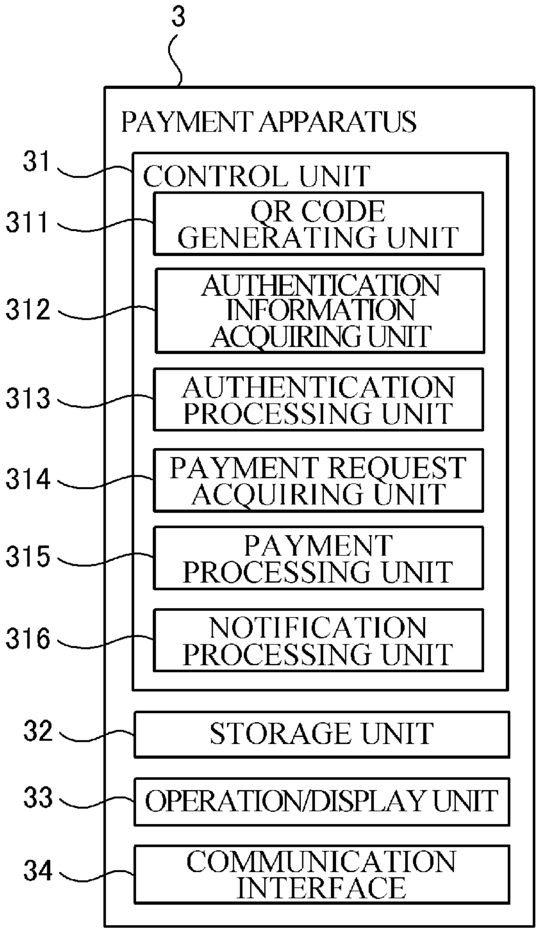
FIG. 2 is a block diagram showing a configuration of a payment apparatus of the information processing system according to an embodiment of the present invention.

The QR code C1 is generated by the payment apparatus 3 of the payment company that has concluded the service contract with the user. As shown in FIG. 2, the payment apparatus 3 includes a control unit 31, and the control unit 31 includes a QR code generating unit 311. The QR code C1 is generated by the QR code generating unit 311. The QR code C1 can be generated by using a known technique. It is noted that other functions of the payment apparatus 3 are described below.

For example, the QR code generating unit 311 sets identification information (a user ID) in association with predetermined information such as personal information acquired from the user. It is noted that the predetermined information acquired from the user includes payment information (for example, credit card information) of the user that is necessary for the payment. The predetermined information of the user is stored in a storage unit 32 of the payment apparatus 3 (see FIG. 2) during the user's registration with the payment company.

The QR code generating unit 311 encrypts information of the user ID, and generates the QR code C1 by executing processes concerning the number of characters, version, error correction level, encoding and the like on the encrypted information. The QR code generating unit 311 generates a QR code image by imaging the generated QR code C1.

It is possible to acquire the user ID by executing a known decoding process on the QR code image.

The QR code image data of the QR code C1 generated by the payment apparatus 3 is transmitted to the user terminal 2 upon request from the user (for example, a log-in operation). It is noted that as described below, the QR code C1 may be generated by the user terminal 2.

[User Terminal 2]

As shown in FIG. 1, the user terminal 2 includes a control unit 21, a storage unit 22, an operation/display unit 23, a communication interface 24, and a camera 25. The user terminal 2 is, for example, a mobile terminal owned by a user of a shop, and is, for example, a smartphone, a mobile phone, or a tablet terminal.

The camera 25 is a digital camera configured to capture an image of an object and output the captured image as image data.

The communication interface 24 is configured to connect the user terminal 2 to the communication network N1 wirelessly or with cable, and execute a data communication with external devices such as the payment apparatuses 3 via the communication network N1 in accordance with a predetermined communication protocol.

The operation/display unit 23 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 22 is a nonvolatile storage unit such as a HDD (Hard Disk Drive), a SSD (Solid State Drive), or a flash memory that stores various types of information. For example, control programs such as a QR code payment processing program and a browser program described below are stored in the storage unit 22. Specifically, the browser program is a control program that causes the control unit 21 to execute a data communication with external devices such as the payment apparatuses 3 in accordance with a communication protocol such as the HTTP (HyperText Transfer Protocol). The QR code payment processing program is a control program that causes the control unit 21 to execute a process corresponding to the payment system S between the shop terminal 1 and the payment apparatuses 3.

The control unit 21 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of processes are stored in advance. The RAM is a volatile or nonvolatile storage unit that is used as a temporary storage memory (working area) for the various types of processes executed by the CPU. The control unit 21 controls the user terminal 2 by causing the CPU to execute various types of control programs that have been stored in the ROM or the storage unit 22 in advance.

Specifically, the control unit 21 includes various processing units such as a QR code acquiring unit 211, a display processing unit 212, and a completion notification acquiring unit 213. The control unit 21 functions as these processing units when it causes the CPU to execute the various processes in accordance with the QR code payment processing program. It is noted that a part or whole of the processing units included in the control unit 21 may be formed as an electronic circuit. In addition, the QR code payment processing program may be a program that causes a plurality of processors to function as the various processing units.

The QR code acquiring unit 211 acquires QR code image data that is transmitted from the payment apparatus 3 upon request of the user. For example, when the user uses the QR code payment, the user activates the payment application of a desired payment site (the payment apparatus 3) that the user can use, logs in the payment apparatus 3, and acquires, from the payment apparatus 3, QR code image data that includes the information (user ID) of the user.

Figure 3:
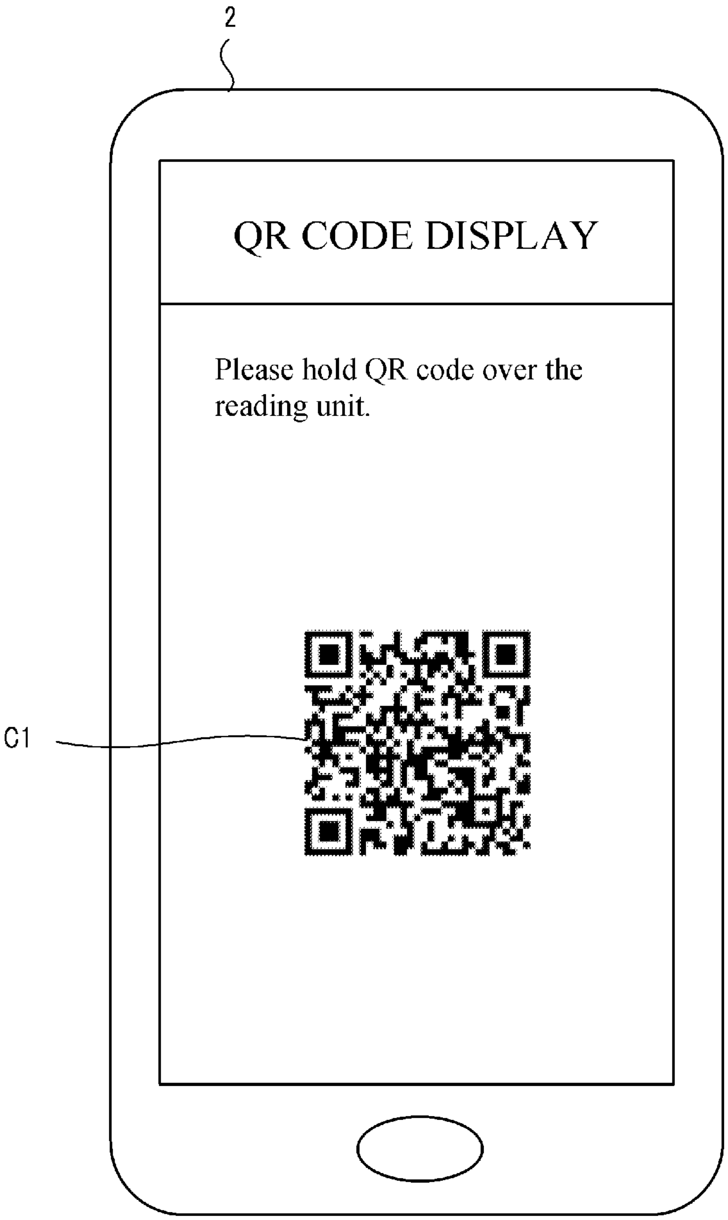
FIG. 3 is a diagram showing an example of a QR code display screen displayed on a user terminal of the information processing system according to an embodiment of the present invention.

The display processing unit 212 displays, on the operation/display unit 23, the QR code C1 that corresponds to the QR code image data acquired by the QR code acquiring unit 211 (see FIG. 3). In addition, the display processing unit 212 displays, on the operation/display unit 23, a message urging the user to hold the QR code C1 displayed on the operation/display unit 23 over the reading unit (a camera 15) of the shop terminal 1. The display processing unit 212 display other various types of messages on the operation/display unit 23.

Figure 4:
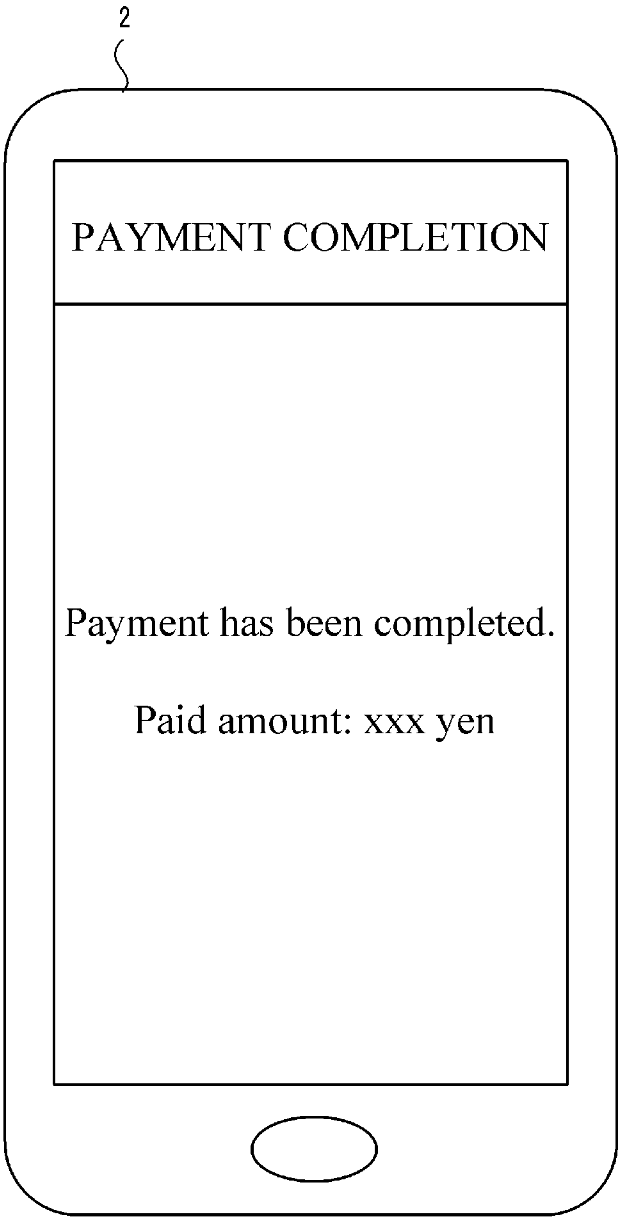
FIG. 4 is a diagram showing an example of a payment completion screen displayed on the user terminal of the information processing system according to an embodiment of the present invention.

The completion notification acquiring unit 213 acquires a payment completion notification transmitted from the payment apparatus 3 when the payment process is completed in the payment apparatus 3. After the completion notification acquiring unit 213 acquires the payment completion notification, the display processing unit 212 displays, on the operation/display unit 23, a message corresponding to the payment completion notification (see FIG. 4).

[Shop Terminal 1]

As shown in FIG. 1, the shop terminal 1 includes a control unit 11, a storage unit 12, an operation/display unit 13, a communication interface 14, and the camera 15. The shop terminal 1 is installed in a facility such as a shop, and operated by the staff of the shop. The shop terminal 1 is, for example, a mobile phone, a smartphone, a tablet terminal, or a personal computer. It is noted that the shop terminal 1 may be provided for each staff member. For example, as the shop terminal 1, a stationary terminal (a register terminal) and a plurality of portable terminals that are carried by the staff may be provided in the shop.

The camera 15 is a digital camera configured to capture an image of an object and output the captured image as image data. For example, the camera 15 captures an image of the QR code image displayed on the user terminal 2 (see FIG. 3).

The communication interface 14 is configured to connect the shop terminal 1 to the communication network N1 wirelessly or with cable, and execute a data communication with external devices such as the payment apparatuses 3 via the communication network N1 in accordance with a predetermined communication protocol.

The operation/display unit 13 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 12 is a nonvolatile storage unit such as a HDD (Hard Disk Drive), a SSD (Solid State Drive), or a flash memory that stores various types of information. For example, control programs such as the QR code payment processing program that causes the control unit 11 to execute a QR code payment process (see FIG. 7) described below are stored in the storage unit 12. For example, the QR code payment processing program is recorded on a non-transitory computer-readable recording medium such as a CD or a DVD, and is read from the recording medium by a reader (not shown) such as a CD drive or a DVD drive which is electrically connected to the shop terminal 1, and the QR code payment processing program is stored in the storage unit 12. It is noted that the QR code payment processing program includes a control program that causes the control unit 11 to execute a process corresponding to the payment system S between the user terminal 2 and the payment apparatuses 3.

In addition, as shown in FIG. 5, information (identification information, payment system information, access information, etc.) of the payment apparatuses 3A, 3B, and 3B is registered in the storage unit 12.

In addition, user information including, for example, a user ID and a use history (described below) of the user in the shop may be stored in the storage unit 12.

The control unit 11 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of processes are stored in advance. The RAM is a volatile or nonvolatile storage unit that is used as a temporary storage memory (working area) for the various types of processes executed by the CPU. The control unit 11 controls the shop terminal 1 by causing the CPU to execute various types of control programs that have been stored in the ROM or the storage unit 12 in advance.

Specifically, the control unit 11 includes various processing units such as a reading processing unit 111, an authentication information acquiring unit 116, an authentication information transmitting unit 112, an authentication result acquiring unit 113, a payment request transmitting unit 114, and a completion notification acquiring unit 115. The control unit 11 functions as these processing units when it causes the CPU to execute the various processes in accordance with the QR code payment processing program. It is noted that a part or whole of the processing units included in the control unit 11 may be formed as an electronic circuit. It is noted that the QR code payment processing program may be a program that causes a plurality of processors to function as the various processing units.

The reading processing unit 111 is configured to cause the camera 25 to capture an image of the QR code image (see FIG. 3) displayed on the operation/display unit 23 of the user terminal 2, and read the QR code C1 from the captured digital image data. The authentication information acquiring unit 116 acquires information (user ID) (authentication information) included in the read QR code C1. The authentication information is information corresponding to the user terminal 2, and in the present example, the authentication information includes identification information (user ID) of the user of the user terminal 2.

The authentication information transmitting unit 112 transmits the authentication information to each of the payment apparatuses 3A, 3B, and 3C based on information (access information) of the payment apparatuses 3A, 3B, and 3B stored in the storage unit 12 (see FIG. 5), wherein the authentication information includes the user ID read by the reading processing unit 111 and acquired by the authentication information acquiring unit 116 in the shop, and information of the shop (shop ID).

The authentication result acquiring unit 113 acquires, from each of the payment apparatuses 3A, 3B, and 3C, a result (authentication result) of the authentication process of the user that was executed based on the user ID. The authentication result is "authentication success" indicating an authentication success, or "authentication error" indicating an authentication failure.

The payment request transmitting unit 114 transmits the payment request that includes information of the bill for the product, to one of the payment apparatuses 3A, 3B, and 3C that has successfully authenticated the user.

The completion notification acquiring unit 115 acquires, from the payment apparatus 3, a notification (payment completion notification) that the payment process that had been executed based on the payment request was completed. After the completion notification acquiring unit 115 acquires the payment completion notification, the control unit 11 displays, on the operation/display unit 13, a message (not shown) corresponding to the payment completion notification.

It is noted that the shop terminal 1 may have, in addition to the above-described functions, functions of a POS terminal that manages the accounting and the inventory.

[Payment Apparatus 3]

FIG. 2 is a block diagram showing a configuration of the payment apparatus 3 according to an embodiment of the present invention. The payment apparatuses 3A, 3B, and 3C have the same configuration.

As shown in FIG. 2, the payment apparatus 3 includes a control unit 31, a storage unit 32, an operation/display unit 33, and a communication interface 34. The payment apparatus 3 is a management server managed by the payment company, and in the payment apparatus 3, a payment system S exclusive to the payment company (see FIG. 1) is installed.

The communication interface 34 is configured to connect the payment apparatus 3 to the communication network N1 wirelessly or with cable, and execute a data communication with external devices such as the user terminal 2 and the shop terminal 1 via the communication network N1 in accordance with a predetermined communication protocol.

The operation/display unit 33 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 32 is a nonvolatile storage unit such as a HDD (Hard Disk Drive), a SSD (Solid State Drive), or a flash memory that stores various types of information. For example, the QR code payment processing program that causes the control unit 31 to execute the QR code payment process (see FIG. 7) described below is stored in the storage unit 32. For example, the QR code payment processing program is recorded on a non-transitory computer-readable recording medium such as a CD or a DVD, and is read from the recording medium by a reader (not shown) such as a CD drive or a DVD drive which is electrically connected to the shop terminal 1, and the QR code payment processing program is stored in the storage unit 32. It is noted that the QR code payment processing program includes a control program that causes the control unit 31 to execute a process corresponding to the payment system S between the shop terminal 1 and the user terminal 2.

In addition, as shown in FIG. 6, the user ID of the user who concluded the service contract with the payment company; and the payment information (for example, information of a credit card company) are registered in the storage unit 32. In addition, a QR code issuance state is registered in the storage unit 32, the QR code issuance state indicating whether or not a QR code has been issued at the present point of time.

The control unit 31 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of processes are stored in advance. The RAM is a volatile or nonvolatile storage unit that is used as a temporary storage memory (working area) for the various types of processes executed by the CPU. The control unit 31 controls the payment apparatus 3 by causing the CPU to execute various types of control programs that have been stored in the ROM or the storage unit 32 in advance.

Specifically, the control unit 31 includes various processing units such as the QR code generating unit 311 described above, an authentication information acquiring unit 312, an authentication processing unit 313, a payment request acquiring unit 314, a payment processing unit 315, and a notification processing unit 316. The control unit 31 functions as these processing units when it causes the CPU to execute the various processes in accordance with the QR code payment processing program. It is noted that a part or whole of the processing units included in the control unit 31 may be formed as an electronic circuit. It is noted that the QR code payment processing program may be a program that causes a plurality of processors to function as the various processing units.

For example, when the user activates a payment application of a desired payment site (a payment apparatus 3) that the user can use, and logs in the payment apparatus 3 to use the QR code payment, the QR code generating unit 311 acquires the identification information (user ID) of the user from the user terminal 2, and generates the QR code C1 that includes the user ID. The QR code generating unit 311 transmits image data of the generated QR code C1 to the user terminal 2.

The authentication information acquiring unit 312 acquires, from the shop terminal 1, the authentication information that includes: the user ID acquired from the QR code C1 displayed on the user terminal 2; and the shop ID.

The authentication processing unit 313 executes the authentication process of the user. Specifically, the authentication processing unit 313 determines whether or not the user ID included in the QR code C1 transmitted to the user terminal 2, namely, the user ID of the user to whom the QR code C1 has been issued (see FIG. 6) matches the user ID acquired from the shop terminal 1. The authentication processing unit 313 determines the authentication as a success when the user IDs match each other, and determines the authentication as an authentication error when the user IDs do not match. The authentication processing unit 313 transmits the authentication result ("authentication success" or "authentication error") to the shop terminal 1. It is noted that the authentication processing unit 313 consults the authentication information and transmits the authentication result to a shop terminal 1 corresponding to the shop ID included in the authentication information.

The payment request acquiring unit 314 acquires the payment request transmitted from the shop terminal 1. For example, one of the payment apparatuses 3A, 3B, and 3C that has successfully authenticated the user acquires, from the shop terminal 1, the payment request including information of a bill for a product. It is noted that the other two payment apparatuses 3 of the payment apparatuses 3A, 3B, and 3C that have failed to authenticate the user may acquire, from the shop terminal 1, a deletion request to delete the authentication information.

The payment processing unit 315, when the payment request acquiring unit 314 acquires the payment request from the shop terminal 1, executes the payment process to pay the bill by a payment method corresponding to the payment information of the user (see FIG. 6).

The notification processing unit 316, when the payment processing unit 315 completes the payment process, transmits a notification (payment completion notification) that the payment process was completed, to the shop terminal 1 and the user terminal 2.

[QR Code Payment Process]

Figure 7:
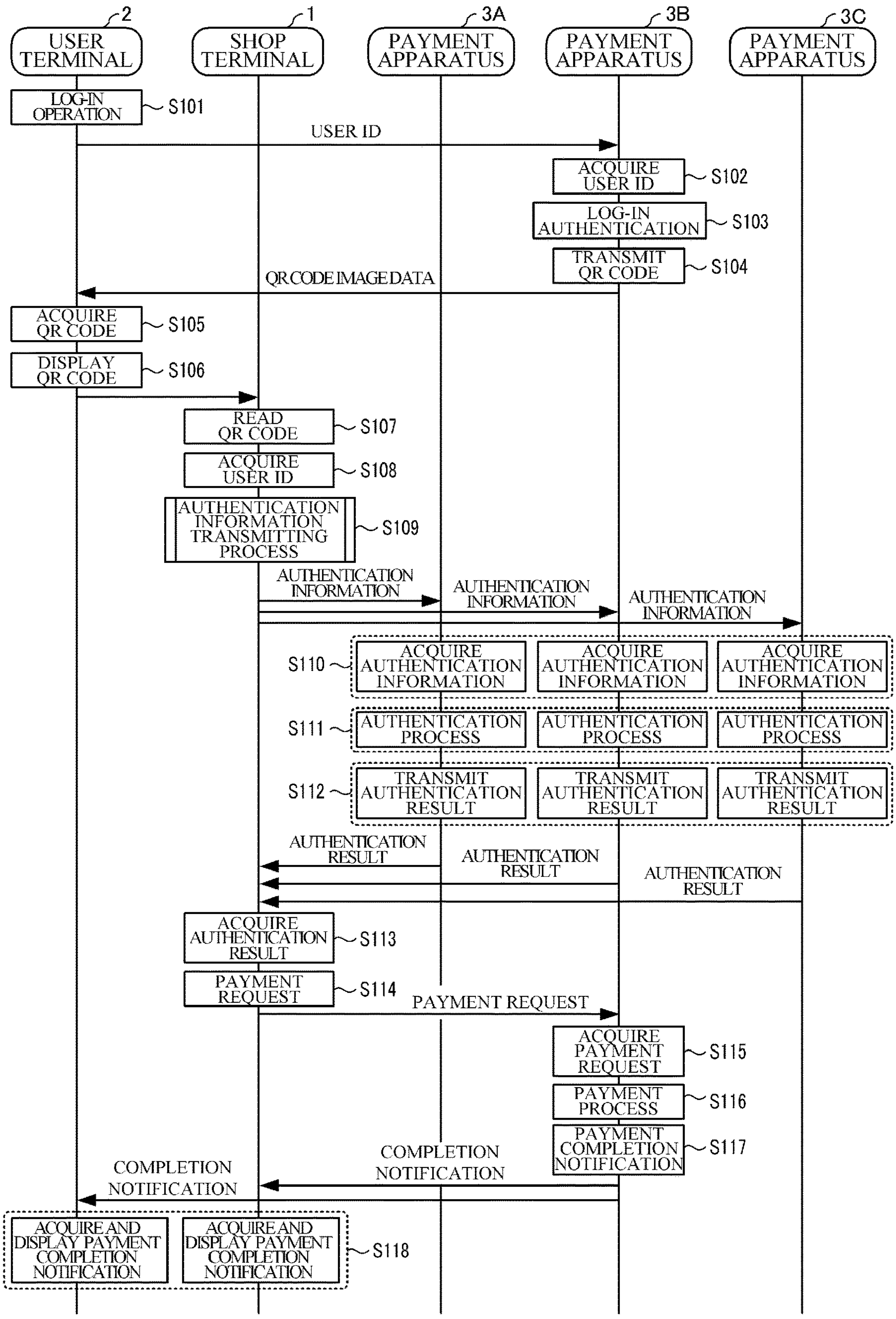
FIG. 7 is a flowchart showing an example of a procedure of a QR code payment process executed in the information processing system according to an embodiment of the present invention.

The following describes the QR code payment process executed by the information processing system 100, with reference to FIG. 7. For example, the QR code payment process is started when the user activates the payment application and performs the log-in operation to buy a product at the shop. It is noted that the QR code payment process may be ended halfway in response to a predetermined operation performed by the user on the user terminal 2.

It is noted that one or more steps included in the QR code payment process described here may be omitted as necessary. In addition, the steps constituting the QR code payment process may be executed in a different order as far as the same action and effect are produced. Furthermore, although the present embodiment describes an example case where the steps constituting the QR code payment process are executed by the control unit 11 of the shop terminal 1, the control unit 21 of the user terminal 2, and the control unit 31 of the payment apparatus 3, in another embodiment, the steps constituting the QR code payment process may be executed by a plurality of processors by distribution.

In the present example case, it is supposed that a user X concludes a service contract with a payment company B in advance, and installs an exclusive payment application from a payment site (a payment apparatus 3B) managed by the payment company B, onto the user terminal 2. In addition, it is supposed that the user X is not using the payment applications of the payment apparatuses 3A and 3C. In addition, in the present example case, the user X buys a product in a shop SH1, and pays the product price (the bill) by the QR code payment.

<Step S101>

In step S101, the user X of the user terminal 2 activates a payment application of the payment apparatus 3B and executes the log-in operation to use the QR code payment. Upon executing the log-in operation, the user terminal 2 transmits the user ID of the user X to the payment apparatus 3B.

<Step S102>

In step S102, the payment apparatus 3B acquires the user ID from the user terminal 2 of the user X.

<Step S103>

In step S103, the payment apparatus 3B executes the authentication process to authenticate the user X based on the user ID. For example, the payment apparatus 3B determines whether or not the user ID is registered in the storage unit 32 (see FIG. 6), successfully authenticates the user X upon determining that the user ID is registered, and rejects to authenticate the user X upon determining that the user ID is not registered.

<Step S104>

Upon successful authentication of the user X, in step S104, the QR code generating unit 311 generates the QR code C1 that includes the user ID (in this case, "user.x" (see FIG. 6)). The QR code generating unit 311 transmits image data of the generated QR code C1 to the user terminal 2 of the user X. The payment apparatus 3B transmits (issues) the QR code C1 to the user terminal 2, and sets the QR code issuance state in the storage unit 32 to "issued" (see FIG. 6). It is noted that the payment apparatuses 3A and 3C are assumed not to have transmitted (issued) the QR code C1 to the user terminal 2 of the user X.

<Step S105>

In step S105, the QR code acquiring unit 211 of the user terminal 2 acquires the QR code image data.

<Step S106>

In step S106, the display processing unit 212 of the user terminal 2 displays, on the operation/display unit 23, the QR code C1 corresponding to the QR code image data (see FIG. 3).

<Step S107>

In step S107, when the user X holds the QR code C1 displayed on the operation/display unit 23 over the reading unit (camera 15) of the shop terminal 1 at the shop SH1, the reading processing unit 111 of the shop terminal 1 causes the camera 25 to capture an image of the QR code C1 (see FIG. 3), and reads the QR code C1 from the captured digital image data.

<Step S108>

In step S108, the authentication information acquiring unit 116 of the shop terminal 1 acquires the user ID of the user X from the read QR code C1.

<Step S109>

In step S109, the authentication information transmitting unit 112 of the shop terminal 1 executes an authentication information transmitting process. Specifically, the authentication information transmitting unit 112 transmits the authentication information to each of the payment apparatuses 3A, 3B, and 3C, wherein the authentication information includes the user ID acquired by the authentication information acquiring unit 116, and information of the shop SH1 (shop ID). Other forms of the authentication information transmitting process are described below.

<Step S110>

In step S110, the authentication information acquiring unit 312 of each of the payment apparatuses 3A, 3B, and 3C acquires the authentication information from the shop terminal 1.

<Step S111>

In step S111, the authentication processing unit 313 of each of the payment apparatuses 3A, 3B, and 3C executes the authentication process of the user X. Specifically, the authentication processing unit 313 determines whether or not the user ID of the user to whom the QR code C1 has been issued (see FIG. 6) matches the user ID acquired from the shop terminal 1. In the present example case, the authentication is determined as a success in the payment apparatus 3B because the payment apparatus 3B has issued the QR code C1 to the user X ("issued"), and the user ID of the user X matches the user ID acquired from the shop terminal 1. On the other hand, in the payment apparatuses 3A and 3C, the authentication is determined as an authentication error because the payment apparatuses 3A and 3C have not issued the QR code C1 to the user X.

<Step S112>

In step S112, the authentication processing unit 313 of each of the payment apparatuses 3A, 3B, and 3C transmits the authentication result ("authentication success" or "authentication error") to the shop terminal 1 of the shop SH1 based on the shop ID included in the authentication information.

<Step S113>

In step S113, the authentication result acquiring unit 113 of the shop terminal 1 acquires the authentication result from each of the payment apparatuses 3A, 3B, and 3C. In the present example case, the shop terminal 1 acquires "authentication success" from the payment apparatus 3A, and "authentication error" from the payment apparatuses 3A and 3B.

<Step S114>

In step S114, the payment request transmitting unit 114 of the shop terminal 1 transmits the payment request including information of the bill for the product, to the payment apparatus 3B that has successfully authenticated the user X among the payment apparatuses 3A, 3B, and 3C. The payment request transmitting unit 114 may transmit, to the payment apparatuses 3A and 3C that have failed to authenticate the user X, a deletion request to delete the authentication information. In addition, in a case where a plurality of payment apparatuses 3 have successfully authenticated the user X, or in a case where no payment apparatus 3 has successfully authenticated the user X, the payment request transmitting unit 114 may not transmit the payment request, but transmit an authentication error notification to the user terminal 2 of the user X.

<Step S115>

In step S115, the payment request acquiring unit 314 of the payment apparatus 3B acquires the payment request from the shop terminal 1.

<Step S116>

In step S116, the payment processing unit 315 of the payment apparatus 3B executes the payment process to pay the bill by a payment method corresponding to the payment information of the user X (see FIG. 6). For example, the payment processing unit 315 executes a credit card payment by a credit card CR1 of the user X.

<Step S117>

Upon completion of the payment process, in step S117, the notification processing unit 316 of the payment apparatus 3B transmits a notification (payment completion notification) that the payment was completed, to the shop terminal 1 of the shop SH1 and the user terminal 2 of the user X.

<Step S118>

In step S118, the completion notification acquiring unit 213 of the user terminal 2 of the user X acquires the payment completion notification from the payment apparatus 3B. The display processing unit 212 of the user terminal 2 displays, on the operation/display unit 23, a message corresponding to the payment completion notification (see FIG. 4). In addition, the completion notification acquiring unit 115 of the shop terminal 1 of the shop SH1 acquires the payment completion notification from the payment apparatus 3B. The control unit 11 of the shop terminal 1 displays, on the operation/display unit 13, a message corresponding to the payment completion notification. The QR code payment process is executed as above.

As described above, in the information processing system 100 according to the present embodiment, the shop terminal 1 reads a QR code displayed on the user terminal 2 that includes authentication information of a user (a user ID), and transmits the read authentication information to a plurality of payment apparatuses 3. Thereafter, among the plurality of payment apparatuses 3, a payment apparatus 3 that has successfully authenticated the authentication information completes a payment. With this configuration, it is possible for the user to perform a QR code payment at a shop by using a payment company (payment system) with which the user has been registered, not limited to a specific payment company (payment system). That is, it is possible for the user to use the QR code payment even in a shop that uses a payment system that is different from a payment system of a payment company with which the user has registered him/herself. In addition, the user does not need to be registered with a plurality of payment systems of a plurality of payment companies. As a result, according to the information processing system 100, it is possible to improve the convenience of the user who uses the QR code payment.

[Modifications]

In the above-described example, the authentication information transmitting unit 112 of the shop terminal 1 transmits the authentication information including the user ID and the shop ID to each of the payment apparatuses 3A, 3B, and 3C. However, the configuration of the authentication information transmitting unit 112 is not limited to the above-described configuration. For example, the authentication information transmitted by the authentication information transmitting unit 112 may contain the payment request that includes information of the bill for the product (Modification 1). With this configuration, the payment processing unit 315 of the payment apparatus 3 that has successfully authenticated can execute the payment process (S116) following the authentication process (S111 in FIG. 7).

In addition, the authentication information transmitting unit 112 may transmit the authentication information to a payment apparatus 3 that is selected from a plurality of payment apparatuses 3 based on type information that identifies the type of the QR code C1. The type information is the number of characters, the number of digits, the version or the like of the QR code. For example, the authentication information transmitting unit 112 transmits the authentication information to a payment apparatus 3 that deals with a QR code having the same number of digits as the acquired QR code C1. This makes it possible to reduce the number of payment apparatuses 3 to which the authentication information is transmitted. As a result, compared to a case where the authentication information is transmitted to all of the payment apparatuses 3, it is possible to reduce the time that is required to acquire the result of the authentication success.

In addition, in the above-described example, the authentication information transmitting unit 112 of the shop terminal 1 transmits the authentication information to the payment apparatuses 3A, 3B, and 3C simultaneously. However, the configuration of the authentication information transmitting unit 112 is not limited to this. For example, the authentication information transmitting unit 112 may transmit the authentication information to a payment apparatus 3, and when the authentication process of the payment apparatus 3 results in an authentication error, may transmit the authentication information to a next payment apparatus 3. With this configuration, when an authentication has succeeded, it is possible to omit the subsequent transmissions of the authentication information to the remaining payment apparatuses 3.

Figure 8:
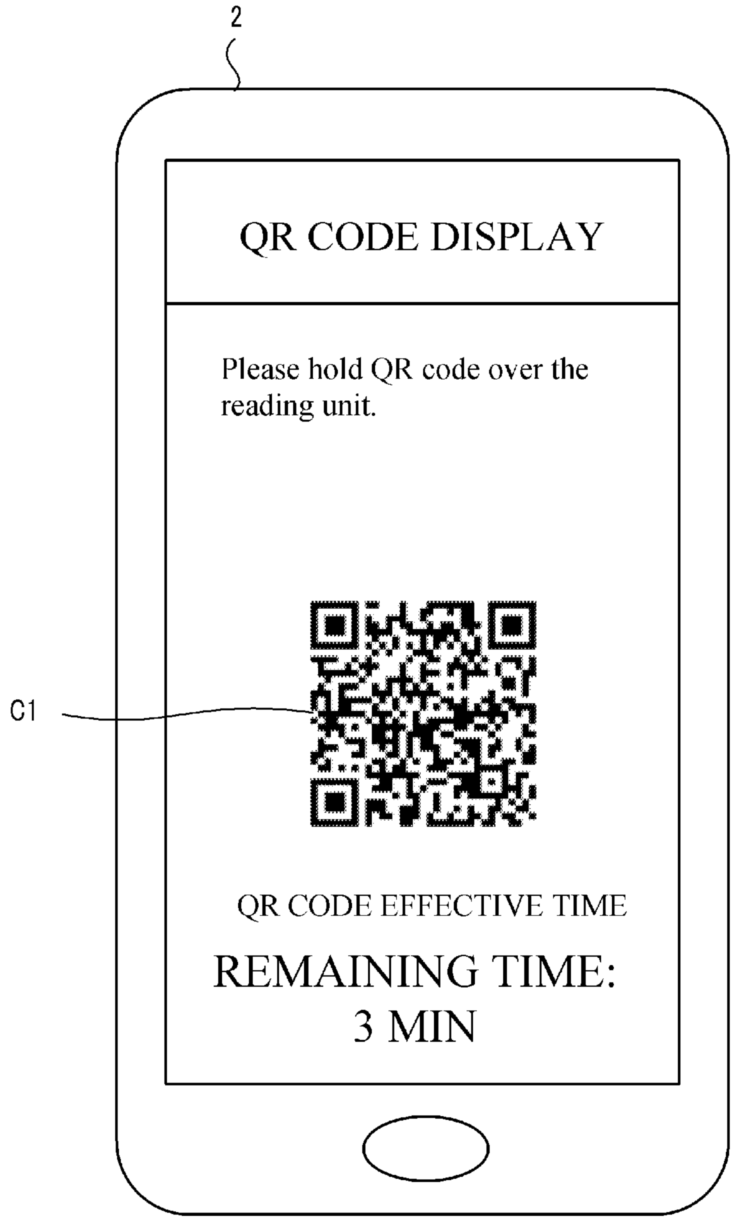
FIG. 8 is a diagram showing an example of the QR code display screen displayed on the user terminal of the information processing system according to an embodiment of the present invention.

In addition, in the above-described example, the QR code C1 issued by a payment apparatus 3 may be what is called a one-time QR code in which an effective time for usage is set. For example, in a case where the effective time of the QR code C1 is set to three minutes, it can be used only for three minutes after the payment apparatus 3 transmits the QR code C1 to the user terminal 2, or after the QR code C1 is displayed on the user terminal 2, and the usage is restricted after an elapse of three minutes. It is noted that as shown in FIG. 8, the remaining time of the effective time is displayed on the operation/display unit 23 of the user terminal 2. Specifically, the payment apparatus 3 transmits restriction information (for example, a display deletion instruction) to the user terminal 2 so that reading of the QR code C1 is restricted when the effective time has elapsed since the QR code C1 was displayed on the user terminal 2. In addition, the payment apparatus 3 may not receive the authentication information when the effective time has elapsed. With this configuration, it is possible to avoid the risk where the QR code C1 is illegally copied, and the QR code payment is made illegally.

In addition, in the above-described example, the QR code C1 is generated by the payment apparatus 3. However, the QR code C1 may be generated by the user terminal 2. For example, the QR code C1 may be generated by executing a program (the QR code payment processing program) installed in the user terminal 2. Specifically, when the user activates the payment application of a desired payment site (the payment apparatus 3) that is installed in the user terminal 2, logs in the payment apparatus 3, and is successfully authenticated in the payment apparatus 3, the user terminal 2 generates the QR code C1 that includes the authentication information of the user (user ID). The user terminal 2 transmits the image data of the generated QR code C1 to the payment apparatus 3. The payment apparatus 3 receives the QR code C1 from the user terminal 2, and acquires the authentication information (user ID). The processes subsequently executed in the user terminal 2, the shop terminal 1, and the payment apparatus 3 are the same as those (S106 to S118) shown in FIG. 7.

[Other Forms of Authentication Information Transmitting Process]

In the above-described authentication information transmitting process (S109) shown in FIG. 7, the authentication information transmitting unit 112 of the shop terminal 1 may transmit the authentication information to each of the payment apparatuses 3A, 3B, and 3C based on the priorities that are set based on a predetermined condition. The predetermined condition may be, for example, positions of the shop terminal 1 and the user terminal 2, the region, user information (for example, use history at the shop), and the communication speed between the shop terminal 1 and the payment apparatus 3. The following describes a specific example of the authentication information transmitting process in which an example of the predetermined condition is applied.

Figure 9:
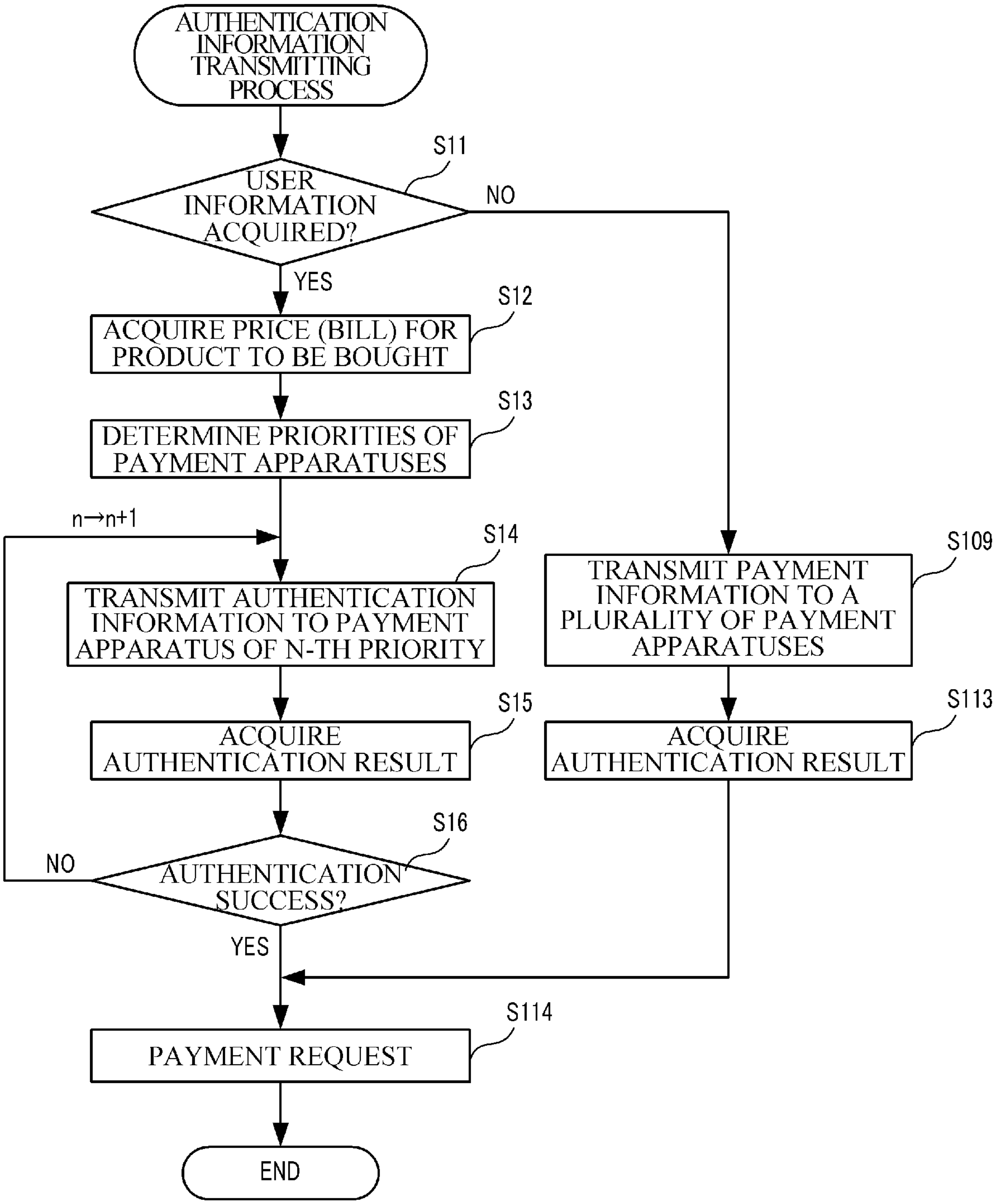
FIG. 9 is a flowchart showing an example of a procedure of an authentication information transmitting process executed in the information processing system according to an embodiment of the present invention.

FIG. 9 is a flowchart showing an example of the procedure of the authentication information transmitting process. In the present example, priorities of the payment apparatuses 3 are determined based on the use history of the user X in the shop SH1, and the authentication information is transmitted to the payment apparatuses 3 in accordance with the priorities. The user information is stored in the storage unit 12 of the shop terminal 1 of the shop SH1, wherein the user information includes, for example, the use history shown in FIG. 10. In FIG. 10, a use history of the user X at the shop SH1 is stored.

For example, the user X concludes service contracts with payment companies A, B, and C and uses payment systems S1, S2, and S3 of the payment companies A, B, and C. In addition, the user X uses different payment companies depending on the amount of money to be used. For example, the user X has a tendency to use the payment company A for payment of a large amount of money (equal to or larger than 50,000 yen), use the payment company B for payment of a small amount of money (equal to or smaller than 10,000 yen), and use the payment company C for payment of the other amount of money (more than 10,000 yen to less than 50,000).

<Step S11>

In step S11, the authentication information transmitting unit 112 of the shop terminal 1 determines whether or not the user information of the user X is registered in the storage unit 12. When the user information of the user X is not registered in the storage unit 12 (S11: NO), a process similar to S109 shown in FIG. 7 is executed.

<Step S12>

When the user information of the user X is registered in the storage unit 12 (S11: YES), the process moves to step S12, in which the authentication information transmitting unit 112 acquires the price (bill) for the product that the user X is going to buy. Here, the bill is supposed to be 7,000 yen. The authentication information transmitting unit 112 acquires information of 7,000 yen as the bill.

<Step S13>

In step S13, the authentication information transmitting unit 112 determines the priorities of the payment apparatuses 3A, 3B, and 3C based on the user information (used amount) (see FIG. 10). For example, the authentication information transmitting unit 112 sets the first priority to the payment apparatus 3B that belongs to a payment company (in the present example, the payment company B) that was used in the past for an amount of money that is closest to the bill, sets the second priority to the payment apparatus 3C that belongs to a payment company (in the present example, the payment company C) that was used in the past for an amount of money that is second closest to the bill, and sets the third priority to the payment apparatus 3B that belongs to a payment company (in the present example, the payment company A) that was used in the past for an amount of money that is third closest to the bill. The authentication information transmitting unit 112 stores a list of set priorities (see FIG. 11) in the storage unit 12.

<Step S14>

In step S14, the authentication information transmitting unit 112 transmits the authentication information including the user ID of the user X and the shop ID of the shop SH1 to the payment apparatus 3B of the first priority.

The authentication processing unit 313 of the payment apparatus 3B determines whether or not the user ID of the user to whom the QR code C1 has been issued (see FIG. 6) matches the user ID included in the authentication information, and transmits the authentication result ("authentication success" or "authentication error") to the shop terminal 1. In the present example, the payment apparatus 3B has issued the QR code C1, and thus the authentication result is "authentication success".

<Step S15>

In step S15, the authentication result acquiring unit 113 of the shop terminal 1 receives the authentication result ("authentication success") from the payment apparatus 3B.

<Step S16>

In step S16, upon acquiring the authentication result "authentication success" (S16: YES), the payment request transmitting unit 114 of the shop terminal 1 executes the same process as S114 shown in FIG. 7 (payment request). In the present example, the payment request transmitting unit 114 of the shop terminal 1 transmits a payment request including information of the bill for the product (7,000 yen) to the payment apparatus 3B.

On the other hand, upon acquiring the authentication result "authentication error" (S16: NO), the payment request transmitting unit 114 returns to step S14, and the authentication information transmitting unit 112 transmits the authentication information including the user ID of the user X and the shop ID of the shop SH1 to the payment apparatus 3C of the second priority.

As described above, with the configuration where the authentication process is executed in a descending order of priority, compared to a case where the authentication process is executed at random to all payment apparatuses 3, it is possible to reduce the time that is required to acquire the result of the authentication success.

In the above-described example, the authentication information transmitting unit 112 determines the priorities of the payment apparatuses 3A, 3B, and 3C based on the amounts of money used by the user X in the past (see FIG. 10). As another example, the authentication information transmitting unit 112 may determine the priorities of the payment apparatuses 3A, 3B, and 3C based on the use dates of the user X in the past (see FIG. 10). For example, as shown in FIG. 10, the user X has the tendency to change the payment company with the passage of years and months, and the user X used the payment company B many times in the year 2016, used the payment company A many times in the first half of the year 2017, and used the payment company C many times in the second half of the year 2017.

In view of the above, in step S13, the authentication information transmitting unit 112 determines the priorities of the payment apparatuses 3A, 3B, and 3C based on the past use dates (see FIG. 10). For example, the authentication information transmitting unit 112 sets the first priority to the payment apparatus 3C that belongs to a payment company (in the present example, the payment company C) that has a past use date that is closest to the day (current) on which the user is buying a product, sets the second priority to the payment apparatus 3A that belongs to a payment company (in the present example, the payment company A) that has a past use date that is second closest to the day (current) on which the user is buying a product, and sets the third priority to the payment apparatus 3B that belongs to a payment company (in the present example, the payment company B) that has a past use date that is third closest to the day (current) on which the user is buying a product. The authentication information transmitting unit 112 stores a list of set priorities (see FIG. 12) in the storage unit 12.

As a further example, the authentication information transmitting unit 112 may determine the priorities of the payment apparatuses 3 to which the authentication information is transmitted, based on the region of the shop used by the user. For example, information (region information) of the payment companies (payment apparatuses 3) shown in FIG. 13 is stored in the storage unit 12 of the shop terminal 1. For example, the payment company A has been used many times in Kanto (east) region, the payment company B has been used many times in Chubu (middle) region, and the payment company C has been used many times in Kansai (west) region. In these circumstances, when the user X is going to buy a product at the shop SH1 that is in Kanto region, the authentication information transmitting unit 112 sets the priorities to the payment apparatuses 3 in order of closeness to the region of the shop SH1. That is, the authentication information transmitting unit 112 sets the first priority to the payment apparatus 3A, sets the second priority to the payment apparatus 3B, and sets the third priority to the payment apparatus 3C.

As a further example, the authentication information transmitting unit 112 may determine the priorities of the payment apparatuses 3 to which the authentication information is transmitted, based on the communication speed between the shop terminal 1 and the payment apparatus 3. For example, information (communication speed information) of the payment companies (payment apparatuses 3) shown in FIG. 14 is stored in the storage unit 12 of the shop terminal 1. For example, when the communication speed between the shop terminal 1 and the payment apparatus 3A is low, the communication speed between the shop terminal 1 and the payment apparatus 3B is high, and the communication speed between the shop terminal 1 and the payment apparatus 3C is middle, the authentication information transmitting unit 112 sets the priorities to the payment apparatuses 3 in order of highness of the communication speed. That is, the authentication information transmitting unit 112 sets the first priority to the payment apparatus 3B, sets the second priority to the payment apparatus 3C, and sets the third priority to the payment apparatus 3A.

In each of the above-described examples where the authentication process is performed to the plurality of payment apparatuses 3 in order of priority, it is possible to reduce the time that is required to acquire the result of the authentication success, compared to a case where the authentication process is executed at random to all of the payment apparatuses 3.

Figure 15:
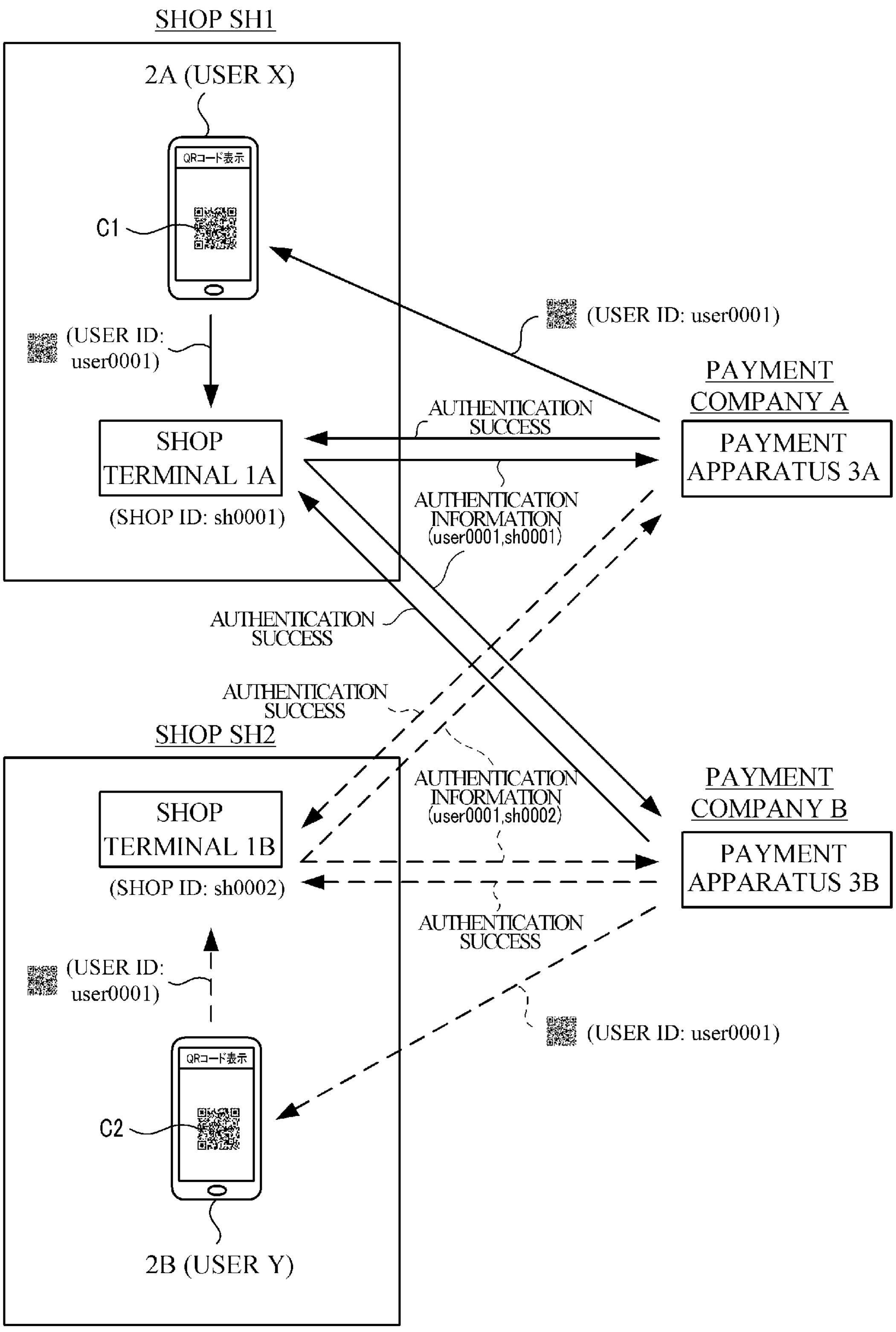
FIG. 15 is a schematic diagram showing a configuration of the information processing system according to an embodiment of the present invention.

Meanwhile, in the information processing system 100, different users X and Y may acquire QR codes C1 and C2 that include the same user ID for use at different shops SH1 and SH2. Originally, it is desirable that the user IDs included in the QR codes C1 and C2 are different for different payment companies. However, when the number of payment companies increases, a possibility is raised that the same user ID is issued. If the same user ID is issued, the payment process may not be executed appropriately, or an illegal payment process may be executed. In particular, such a case may occur when the use time zones of the users X and Y are close to each other. FIG. 15 shows a specific example of such a case.

As shown in FIG. 15, it is supposed that the user X acquires a user ID "user0001" from the payment apparatus 3A of the payment company A for use at the shop SH1, and on the other hand, the user Y acquires the user ID "user0001" from the payment apparatus 3B of the payment company B for use at the shop SH2. In this case, the user ID issued from the payment apparatus 3A and the user ID issued from the payment apparatus 3B are the same.

In the above-described case, upon reading the QR code C1, the shop terminal 1A transmits the authentication information (user ID "user0001" and shop ID "sh0001") to the payment apparatuses 3A and 3B. In addition, upon reading the QR code C2, the shop terminal 1B transmits the authentication information (user ID "user0001" and shop ID "sh0002") to the payment apparatuses 3A and 3B.

The authentication processing unit 313 of the payment apparatus 3A determines whether or not the user ID of the user to whom the QR code C1 has been issued matches the user ID acquired from the shop terminal 1A, and determines that both user IDs are "user0001" and match each other. In addition, the authentication processing unit 313 determines whether or not the user ID of the user to whom the QR code C1 has been issued matches the user ID acquired from the shop terminal 1B, and determines that both user IDs are "user0001" and match each other. Subsequently, the payment apparatus 3A transmits authentication result "authentication success" to both the shop terminals 1A and 1B.

Similarly, the authentication processing unit 313 of the payment apparatus 3B determines whether or not the user ID of the user to whom the QR code C2 has been issued matches the user ID acquired from the shop terminal 1A, and determines that both user IDs are "user0001" and match each other. In addition, the authentication processing unit 313 determines whether or not the user ID of the user to whom the QR code C2 has been issued matches the user ID acquired from the shop terminal 1B, and determines that both user IDs are "user0001" and match each other. Subsequently, the payment apparatus 3B transmits authentication result "authentication success" to both the shop terminals 1A and 1B.

The shop terminal 1A acquires the authentication result "authentication success" from a plurality of payment apparatuses 3A and 3B, and the payment request transmitting unit 114 of the shop terminal 1A does not transmit the payment request, but transmits an authentication error notification to the user terminal 2A. Similarly, the shop terminal 1B acquires the authentication result "authentication success" from a plurality of payment apparatuses 3A and 3B, and the payment request transmitting unit 114 of the shop terminal 1B does not transmit the payment request, but transmits an authentication error notification to the user terminal 2B.

In the above-described case, QR code payments for the users X and Y are not performed appropriately. In addition, as in the above-described Modification 1, in a case where the authentication information transmitting unit 112 transmits the authentication information including the payment request, payment processes of paying the bill for the user X are executed by both the payment apparatuses 3A and 3B that have successfully authenticated (duplicate payments are made). Similarly, duplicate payments are also made with respect to the user Y.

Figure 16:
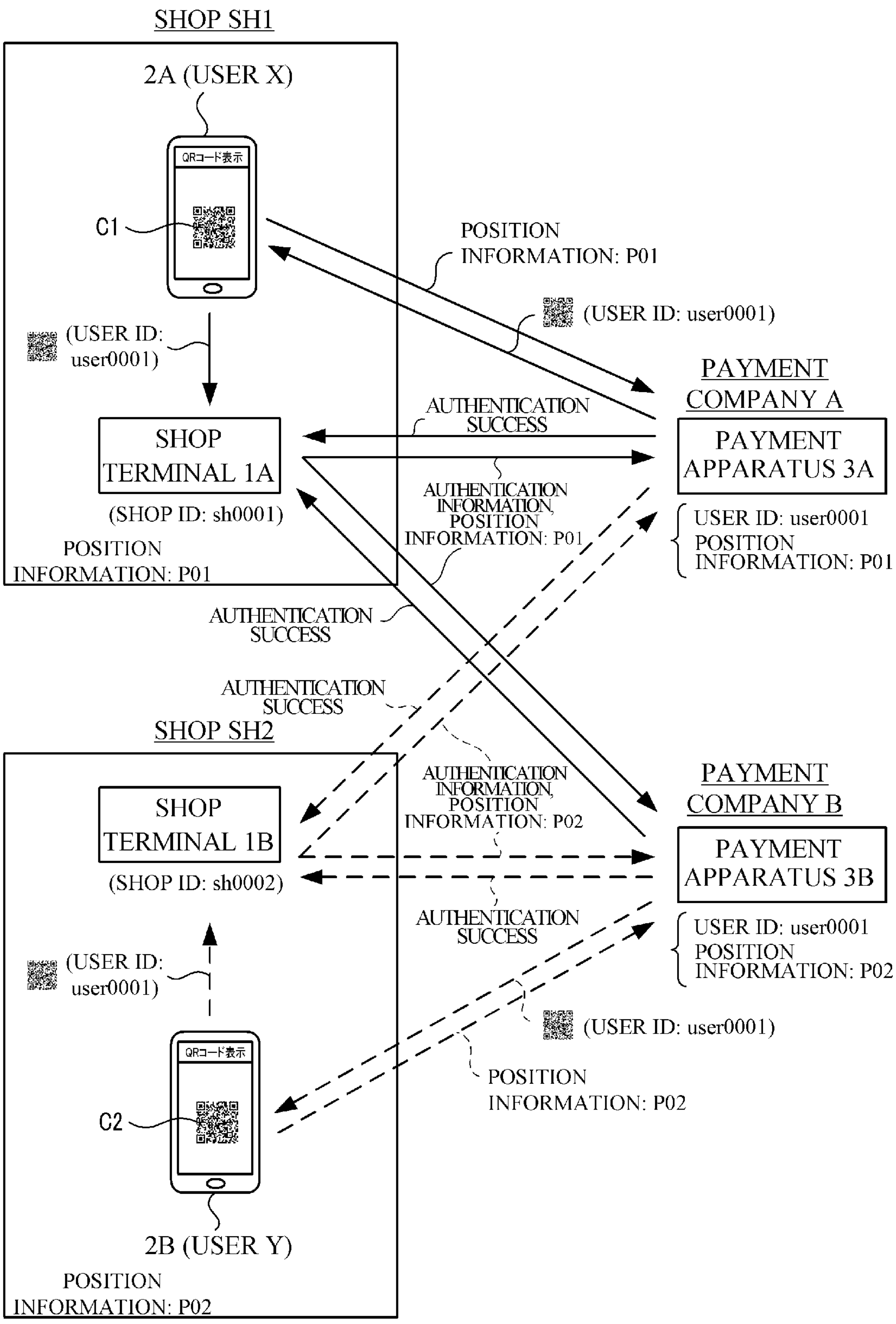
FIG. 16 is a schematic diagram showing a configuration of the information processing system according to an embodiment of the present invention.

To prevent the above-described problem, the information processing system 100 is desirably configured such that, as shown in FIG. 16, the authentication processing unit 313 of the payment apparatus 3 acquires position information of both the user (user terminal 2) and the shop terminal 1, and executes the authentication process of the user based on the acquired position information.

For example, as shown in FIG. 16, when the user X performs the log-in operation, the payment apparatus 3A acquires position information P01 of the user terminal 2A. The payment apparatus 3A associates the acquired position information "P01" with the user ID "user0001". Similarly, when the user Y performs the log-in operation, the payment apparatus 3B acquires position information P02 of the user terminal 2B. The payment apparatus 3B associates the acquired position information "P02" with the user ID "user0001". Thereafter, the shop terminal 1A transmits, to the payment apparatuses 3A and 3B, the position information "P01" of the shop terminal 1A, as well as the authentication information. Similarly, the shop terminal 1B transmits, to the payment apparatuses 3A and 3B, the position information "P02" of the shop terminal 1B, as well as the authentication information.

The authentication processing unit 313 of the payment apparatus 3A determines whether or not the user ID "user0001" of the user to whom the QR code C1 has been issued matches the user ID "user0001" acquired from the shop terminal 1A, and determines whether or not the position information "P01" associated with the user ID "user0001" matches the position information "P01" acquired from the shop terminal 1A. In the present example, the authentication processing unit 313 determines that the user IDs match each other and the two pieces of position information "P01" match each other. In addition, the authentication processing unit 313 determines whether or not the user ID "user0001" of the user to whom the QR code C2 has been issued matches the user ID "user0001" acquired from the shop terminal 1B, and determines whether or not the position information "P01" associated with the user ID "user0001" matches the position information "P02" acquired from the shop terminal 1B. In the present example, the authentication processing unit 313 determines that the user IDs match each other, but the position information "P01" and the position information "P02" do not match each other. As a result, the payment apparatus 3A transmits authentication result "authentication success" to the shop terminal 1A, and transmits authentication result "authentication error" to the shop terminal 1B.

The authentication processing unit 313 of the payment apparatus 3B executes a similar process. As a result, the payment apparatus 3B transmits authentication result "authentication success" to the shop terminal 1B, and transmits authentication result "authentication error" to the shop terminal 1A.

With the above-described configuration, the payment process of the bill for the user X is appropriately executed in the payment apparatus 3A, and the payment process of the bill for the user Y is appropriately executed in the payment apparatus 3B. It is noted that in the determination process of the position information, the position information (for example, "P01") of the user and the position information (for example, "P01") of the shop may not completely match each other. When two pieces of position information are in a predetermined range, it may be determined that the two pieces of position information match each other.

OTHER EMBODIMENTS

According to the above-described embodiment (Embodiment 1), the shop terminal 1 (the information processing apparatus, the second terminal) reads the QR code C1 displayed on the user terminal 2 (the first terminal), and the shop terminal 1 transmits the authentication information (including the user ID) to a plurality of payment apparatuses 3. As another embodiment (Embodiment 2), for example, the user terminal 2 may read the QR code C1 displayed on the shop terminal 1, and the user terminal 2 may transmit the authentication information corresponding to the shop terminal 1 to a plurality of payment apparatuses 3. Namely, the first terminal (a terminal on which the QR code C1 is displayed) of the present invention may be the shop terminal 1, and the information processing apparatus and the second terminal (a terminal that reads the QR code C1) may be the user terminal 2.

In the configuration of Embodiment 2, for example, the QR code C1 includes a shop ID and information of a bill for a product, where the shop ID is authentication information corresponding to the shop terminal 1. Upon reading the QR code C1, the user terminal 2 transmits authentication information including the shop ID and the user ID to a plurality of payment apparatuses 3. The authentication processing unit 313 of each of the plurality of payment apparatuses 3 determines whether or not the shop ID of the shop to which the QR code C1 has been issued matches the shop ID acquired from the user terminal 2. In addition, the authentication processing unit 313 of each of the payment apparatuses 3 determines whether or not the user ID acquired from the user terminal 2 is included in a user ID list which has been registered in advance. When the two shop IDs match each other, and the user ID is included in the user ID list, the payment apparatus 3 transmits authentication result "authentication success" to the user terminal 2.

Upon acquiring the authentication result "authentication success", the user terminal 2 transmits a payment request that includes information of a bill for a product to a payment apparatus 3 that has successfully authenticated among the plurality of payment apparatuses 3.

Upon acquiring the payment request from the user terminal 2, the payment processing unit 315 of the payment apparatus 3 executes the payment process to pay the bill by a payment method corresponding to the payment information (see FIG. 6) of the user.

With the above-described configuration, the user does not need to activate a payment application of a specific payment company (payment system) that is used by the shop, but can complete the payment based on a QR code acquired from the shop terminal 1. Thus it is possible to improve the convenience of the user who uses the QR code payment. It is noted that in the configuration of Embodiment 2, the QR code C1 displayed on the shop terminal 1 is preferably what is called a one-time QR code in which an effective time for usage is set. This allows the shop used by the user to complete the payment in a reliable manner.

Figure 17:
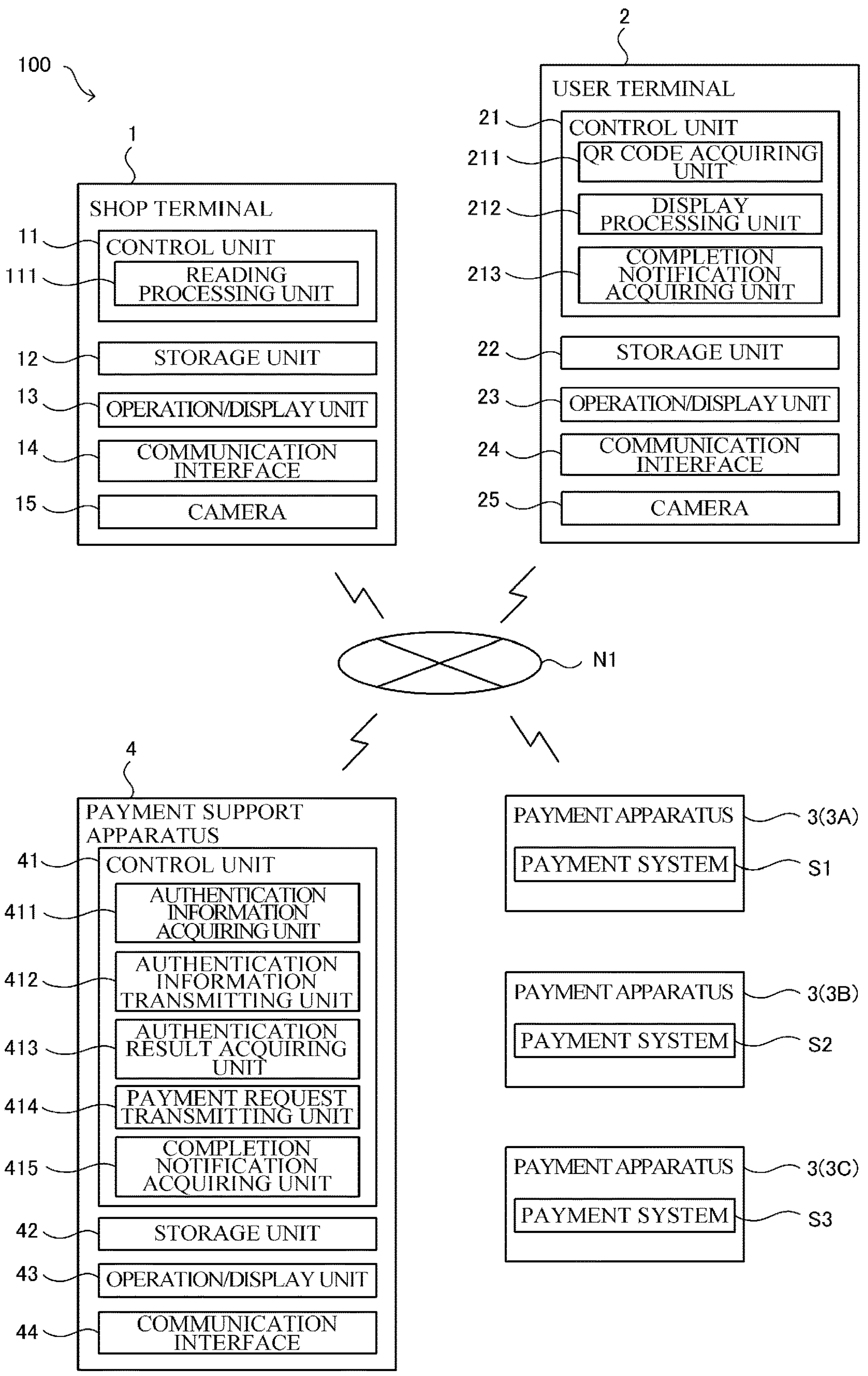
FIG. 17 is a block diagram showing a configuration of the information processing system according to an embodiment of the present invention.

In addition, as another embodiment (Embodiment 3), as shown in FIG. 17, the information processing system 100 may include a payment support apparatus 4 (the information processing apparatus). The payment support apparatus 4 is configured to communicate with the shop terminal 1, the user terminal 2, and the plurality of payment apparatuses 3 via the communication network N1 that is, for example, the Internet, a LAN, a WAN, or a public telephone line. The payment support apparatus 4 includes a control unit 41, a storage unit 42, an operation/display unit 43, and a communication interface 44. The control unit 41 includes an authentication information acquiring unit 411, an authentication information transmitting unit 412, an authentication result acquiring unit 413, a payment request transmitting unit 414, and a completion notification acquiring unit 415.

The control unit 41 includes control equipment such as a CPU, a ROM, and a RAM. The CPU is a processor for executing various types of calculation processes. The ROM is a nonvolatile storage unit in which control programs such as a BIOS and an OS for causing the CPU to execute various types of processes are stored in advance. The RAM is a volatile or nonvolatile storage unit that is used as a temporary storage memory (working area) for the various types of processes executed by the CPU. The control unit 41 controls the payment support apparatus 4 by causing the CPU to execute various types of control programs that have been stored in the ROM or the storage unit 12 in advance.

The authentication information acquiring unit 411 acquires, from a QR code, authentication information (a user ID; or a user ID and a shop ID) of the user of the user terminal 2. For example, the reading processing unit 111 of the shop terminal 1 causes the camera 25 to capture an image of the QR code C1 (see FIG. 3), and reads the QR code C1 from the captured digital image data. The reading processing unit 111 transmits the authentication information that was acquired from the read QR code C1, to the payment support apparatus 4. The authentication information acquiring unit 411 of the payment support apparatus 4 acquires the authentication information from the shop terminal 1.

The authentication information transmitting unit 412 transmits the authentication information to a plurality of payment apparatuses 3. The authentication result acquiring unit 413 acquires an authentication result for the authentication information from at least one of the plurality of payment apparatuses 3. The authentication information transmitting unit 412, the authentication result acquiring unit 413, and the payment request transmitting unit 414 execute the same processes as the authentication information transmitting unit 112, the authentication result acquiring unit 113, and the payment request transmitting unit 114 of the shop terminal 1 described in Embodiment 1 (see FIG. 1). In addition, the storage unit 42 may have the same configuration as the storage unit 12 of the shop terminal 1 described in Embodiment 1.

The completion notification acquiring unit 415 acquires, from one of the payment apparatuses 3, a notification (payment completion notification) that the payment process executed based on the payment request was completed. In addition, upon acquiring the payment completion notification, the completion notification acquiring unit 415 transmits the payment completion notification to, for example, the shop terminal 1 and the user terminal 2.

As described above, the information processing apparatus of the present invention includes: an authentication information acquiring unit configured to acquire authentication information of a user of a first terminal (for example, the shop terminal 1 or the user terminal 2), the authentication information being included in an information code displayed on the first terminal; an authentication information transmitting unit configured to transmit the authentication information acquired by the authentication information acquiring unit to a plurality of payment apparatuses 3; and an authentication result acquiring unit configured to acquire an authentication result for the authentication information from at least one of the plurality of payment apparatuses 3. It is noted that, not limited to the information code, the authentication information acquiring unit may acquire the authentication information via another medium or the communication network N1.

According to the information processing system 100 of the above-described embodiments, the information processing apparatus (for example, the shop terminal 1) does not need to install a plurality of applications corresponding to a plurality of payment systems of a plurality of payment companies. This makes it possible to effectively use the computer resources. In addition, the shop terminal 1 transmits the authentication information and the payment request to the plurality of payment apparatuses 3 without establishing communications with the payment apparatuses 3 respectively corresponding to the payment systems. This makes it possible to improve the processing speed of completing the payment.

[Notes of Invention]

The following are notes regarding the summary of the invention extracted from the above-described embodiments. It is noted that the configurations and processing functions described in the following notes can be selected and combined arbitrarily.

<Note 1>

An information processing apparatus comprising:

an authentication information acquiring unit configured to acquire authentication information corresponding to a first terminal;

an authentication information transmitting unit configured to transmit the authentication information acquired by the authentication information acquiring unit to a plurality of payment apparatuses; and an authentication result acquiring unit configured to acquire an authentication result for the authentication information from at least one of the plurality of payment apparatuses.

<Note 2>

The information processing apparatus according to Note 1, further comprising:

a reading processing unit configured to read an information code displayed on the first terminal, the information code including the authentication information, wherein the authentication information acquiring unit acquires the authentication information based on the information code read by the reading processing unit.

<Note 3>

The information processing apparatus according to Note 1 or 2, further comprising:

a payment request transmitting unit configured to transmit a payment request requesting to pay a bill, to any of the plurality of payment apparatuses that has successfully authenticated the authentication information.

<Note 4>

The information processing apparatus according to Note 1 or 2, wherein the authentication information includes a payment request requesting to pay a bill, and the information processing apparatus further comprises:

a completion notification acquiring unit configured to acquire, from any of the plurality of payment apparatuses that has successfully authenticated the authentication information, a payment completion notification notifying that a payment of the bill was completed.

<Note 5>

The information processing apparatus according to any one of Notes 2 to 4, wherein in the information code, an effective time is set, the effective time being a time for which the information code can be used, and reading of the information code by the reading processing unit is restricted after an elapse of the effective time since the information code was displayed on the first terminal.

<Note 6>

The information processing apparatus according to any one of Notes 1 to 5, wherein the authentication information transmitting unit transmits the authentication information to a first payment apparatus that is included in the plurality of payment apparatuses, and when the first payment apparatus has successfully authenticated the authentication information, the authentication information transmitting unit does not transmit the authentication information to a second payment apparatus that is included in the plurality of payment apparatuses.

<Note 7>

The information processing apparatus according to any one of Notes 1 to 6, wherein the authentication information transmitting unit transmits the authentication information to a payment apparatus that is selected from the plurality of payment apparatuses based on type information that identifies a type of the information code.

<Note 8>

The information processing apparatus according to any one of Notes 1 to 6, wherein the authentication information transmitting unit transmits the authentication information to the plurality of payment apparatuses based on priorities that are set based on a predetermined condition.

<Note 9>

The information processing apparatus according to any one of Notes 1 to 8, wherein the first terminal is a mobile terminal used by a user who buys a product, and the information processing apparatus is a shop terminal of a shop that provides the product.

<Note 10>

An information processing method comprising:

acquiring authentication information corresponding to a first terminal;

transmitting the acquired authentication information to a plurality of payment apparatuses; and acquiring an authentication result for the authentication information from at least one of the plurality of payment apparatuses.

<Note 11>

A program for causing a computer to execute:

a step of acquiring authentication information corresponding to a first terminal;

a step of transmitting the acquired authentication information to a plurality of payment apparatuses; and a step of acquiring an authentication result for the authentication information from at least one of the plurality of payment apparatuses.

<Note 12>

An information processing system including a first terminal and a second terminal, the first terminal configured to display an information code, the second terminal configured to read the information code, the information processing system comprising:

a position information acquiring unit configured to acquire first position information and second position information, the first position information indicating a position of the first terminal, the second position information indicating a position of the second terminal;

an authentication information acquiring unit configured to acquire authentication information corresponding to the first terminal;

an authentication information transmitting unit configured to transmit the authentication information acquired by the authentication information acquiring unit to a plurality of payment apparatuses; and an authentication processing unit configured to perform an authentication of a user based on the first position information and the second position information.

The invention claimed is:

1. A shop terminal comprising:

a reading processing circuit configured to read a two-dimensional code displayed on a first terminal, the two-dimensional code including authentication information;

an authentication information acquiring circuit configured to acquire the authentication information corresponding to the first terminal based on the two-dimensional code read by the reading processing circuit;

an authentication information transmitting circuit configured to transmit the authentication information acquired by the authentication information acquiring circuit to a plurality of two-dimensional code payment apparatuses that respectively correspond to a plurality of different two-dimensional code payment companies; and an authentication result acquiring circuit configured to acquire an authentication result for the authentication information from at least one of the plurality of two-dimensional code payment apparatuses, wherein a plurality of two-dimensional code payment systems exclusive to the plurality of different two-dimensional code payment companies, respectively, are respectively installed on the plurality of two-dimensional code payment apparatuses;

the authentication information acquiring circuit is configured to acquire authentication information sent by any of the plurality of two-dimensional code payment systems;

the authentication information transmitting circuit is configured to transmit authentication information sent by any of the plurality of two-dimensional code payment systems;

the authentication information transmitting circuit transmits the authentication information to the plurality of two-dimensional code payment apparatuses in an order of priority that is set based on a predetermined condition, so that the authentication information transmitting circuit is thereby configured to reduce a time that is required to acquire the authentication result;

the predetermined condition is at least one selected from the group of an amount on a bill, a past use date, a region of a shop used by a user, and a communication speed between the shop terminal and the plurality of two-dimensional code payment apparatuses; and the authentication information transmitting circuit transmits the authentication information to the plurality of two-dimensional code payment apparatuses without establishing direct communications with the plurality of two-dimensional code payment apparatuses respectively corresponding to the plurality of two-dimensional code payment systems.

2. The shop terminal according to claim 1, further comprising:

a payment request transmitting circuit configured to transmit a payment request requesting to pay a bill, to any of the plurality of two-dimensional code payment apparatuses that has successfully authenticated the authentication information.

3. The shop terminal according to claim 1, wherein the authentication information includes a payment request requesting to pay a bill, and the shop terminal further comprises:

a completion notification acquiring circuit configured to acquire, from any of the plurality of two-dimensional code payment apparatuses that has successfully authenticated the authentication information, a payment completion notification notifying that a payment of the bill was completed.

4. The shop terminal according to claim 1, wherein in the two-dimensional code, an effective time is set, the effective time being a time for which the two-dimensional code can be used, and reading of the two-dimensional code by the reading processing circuit is restricted after an elapse of the effective time since the two-dimensional code was displayed on the first terminal.

5. The shop terminal according to claim 1, wherein the authentication information transmitting circuit transmits the authentication information to a first two-dimensional code payment apparatus that is included in the plurality of two-dimensional code payment apparatuses, and when the first two-dimensional code payment apparatus has successfully authenticated the authentication information, the authentication information transmitting circuit does not transmit the authentication information to a second two-dimensional code payment apparatus that is included in the plurality of two-dimensional code payment apparatuses.

6. The shop terminal according to claim 1, wherein the authentication information transmitting circuit transmits the authentication information to a two-dimensional code payment apparatus that is selected from the plurality of two-dimensional code payment apparatuses based on type information that identifies a type of two-dimensional code.

7. The shop terminal according to claim 1, wherein the first terminal is a mobile terminal used by the user who buys a product.

8. The shop terminal according to claim 1, wherein different two-dimensional code payment systems are respectively installed on the plurality of two-dimensional code payment apparatuses.

9. The shop terminal according to claim 1, wherein when the predetermined condition is at least the amount on the bill, the authentication information transmitting circuit transmits the authentication information to the plurality of two-dimensional code payment apparatuses based on priorities that are set based on the amount on the bill;

when the predetermined condition is at least the past use date, the authentication information transmitting circuit transmits the authentication information to the plurality of two-dimensional code payment apparatuses based on priorities that are set based on the past use date;

when the predetermined condition is at least the region of the shop used by the user, the authentication information transmitting circuit transmits the authentication information to the plurality of two-dimensional code payment apparatuses based on priorities that are set based on the region of the shop used by the user; and when the predetermined condition is at least the communication speed between the shop terminal and the plurality of two-dimensional code payment apparatuses, the authentication information transmitting circuit transmits the authentication information to the plurality of two-dimensional code payment apparatuses based on priorities that are set based on the communication speed between the shop terminal and the plurality of two-dimensional code payment apparatuses.

10. The shop terminal according to claim 1, wherein the authentication information transmitting circuit is further configured to:

store region information for each of the plurality of two-dimensional code payment apparatuses;

determine a geographical region of the first terminal;

set an order of priority based on proximities between the determined geographical region of the first terminal and the stored region information for each of the plurality of two-dimensional code payment apparatuses; and transmit the authentication information to the plurality of two-dimensional code payment apparatuses in the order of priority, so that the authentication information transmitting circuit is thereby configured to reduce the time that is required to acquire the authentication result.

11. The shop terminal according to claim 10, wherein the stored region information indicates a frequency of use of the two-dimensional code payment companies in each geographical region.

12. An information processing method executable by a processor of a shop terminal, the information processing method comprising:

acquiring authentication information corresponding to a first terminal, the authentication information sent by any of a plurality of two-dimensional code payment systems;

transmitting the acquired authentication information sent by any of the plurality of two-dimensional code payment systems to a plurality of two-dimensional code payment apparatuses that respectively correspond to a plurality of different two-dimensional code payment companies; and acquiring an authentication result for the authentication information from at least one of the plurality of two-dimensional code payment apparatuses, wherein the plurality of two-dimensional code payment systems exclusive to the plurality of different two-dimensional code payment companies, respectively, are respectively installed on the plurality of two-dimensional code payment apparatuses;

the authentication information is transmitted to the plurality of two-dimensional code payment apparatuses in an order of priority that is set based on a predetermined condition, so as to reduce a time that is required to acquire the authentication result;

the predetermined condition is at least one selected from the group of an amount on a bill, a past use date, a region of a shop used by a user, and a communication speed between the shop terminal and the plurality of two-dimensional code payment apparatuses; and the authentication information is transmitted to the plurality of two-dimensional code payment apparatuses without establishing direct communications with the plurality of two-dimensional code payment apparatuses respectively corresponding to the plurality of two-dimensional code payment systems.

13. The information processing method according to claim 12, wherein when the predetermined condition is at least the amount on the bill, the authentication information is transmitted to the plurality of two-dimensional code payment apparatuses based on priorities that are set based on the amount on the bill;

when the predetermined condition is at least the past use date, the authentication information is transmitted to the plurality of two-dimensional code payment apparatuses based on priorities that are set based on the past use date;

when the predetermined condition is at least the region of the shop used by the user, the authentication information is transmitted to the plurality of two-dimensional code payment apparatuses based on priorities that are set based on the region of the shop used by the user; and when the predetermined condition is at least the communication speed between the shop terminal and the plurality of two-dimensional code payment apparatuses, the authentication information is transmitted to the plurality of two-dimensional code payment apparatuses based on priorities that are set based on the communication speed between the shop terminal and the plurality of two-dimensional code payment apparatuses.

14. A non-transitory computer-readable recording medium on which is recorded a program for causing a computer of a shop terminal to execute:

a step of acquiring authentication information corresponding to a first terminal, the authentication information sent by any of a plurality of two-dimensional code payment systems;

a step of transmitting the acquired authentication information sent by any of the plurality of two-dimensional code payment systems to a plurality of two-dimensional code payment apparatuses that respectively correspond to a plurality of different two-dimensional code payment companies; and a step of acquiring an authentication result for the authentication information from at least one of the plurality of two-dimensional code payment apparatuses, wherein the plurality of two-dimensional code payment systems exclusive to the plurality of different two-dimensional code payment companies, respectively, are respectively installed on the plurality of two-dimensional code payment apparatuses;

the authentication information is transmitted to the plurality of two-dimensional code payment apparatuses in an order of priority that is set based on a predetermined condition, so as to reduce a time that is required to acquire the authentication result;

the predetermined condition is at least one selected from the group of an amount on a bill, a past use date, a region of a shop used by a user, and a communication speed between the computer and the plurality of two-dimensional code payment apparatuses; and the authentication information is transmitted to the plurality of two-dimensional code payment apparatuses without establishing direct communications with the plurality of two-dimensional code payment apparatuses respectively corresponding to the plurality of two-dimensional code payment systems.

15. The non-transitory computer-readable recording medium according to claim 11, wherein when the predetermined condition is at least the amount on the bill, the authentication information is transmitted to the plurality of two-dimensional code payment apparatuses based on priorities that are set based on the amount on the bill;

when the predetermined condition is at least the past use date, the authentication information is transmitted to the plurality of two-dimensional code payment apparatuses based on priorities that are set based on the past use date;

when the predetermined condition is at least the region of the shop used by the user, the authentication information is transmitted to the plurality of two-dimensional code payment apparatuses based on priorities that are set based on the region of the shop used by the user; and when the predetermined condition is at least the communication speed between the computer and the plurality of two-dimensional code payment apparatuses, the authentication information is transmitted to the plurality of two-dimensional code payment apparatuses based on priorities that are set based on the communication speed between the computer and the plurality of two-dimensional code payment apparatuses.

16. An information processing system including a mobile terminal and a shop terminal, the mobile terminal being configured to display a two-dimensional code, the shop terminal being configured to read the two-dimensional code, the information processing system comprising:

a position information acquiring circuit configured to acquire first position information and second position information, the first position information indicating a position of the mobile terminal, the second position information indicating a position of the shop terminal;

an authentication information acquiring circuit configured to acquire authentication information corresponding to the mobile terminal;

an authentication information transmitting circuit configured to, in an order of priority that is set based on a predetermined condition, so that the authentication information transmitting circuit is thereby configured to reduce a time that is required to acquire an authentication result, transmit the authentication information acquired by the authentication information acquiring circuit to a plurality of two-dimensional code payment apparatuses that respectively correspond to a plurality of different two-dimensional code payment companies; and a respective authentication processing circuit provided in each of the plurality of two-dimensional code payment apparatuses and configured to perform an authentication of a user based on the authentication information, the first position information, and the second position information, wherein a plurality of two-dimensional code payment systems exclusive to the plurality of different two-dimensional code payment companies, respectively, are respectively installed on the plurality of two-dimensional code payment apparatuses;

the authentication information acquiring circuit is configured to acquire authentication information sent by any of the plurality of two-dimensional code payment systems;

the authentication information transmitting circuit is configured to transmit authentication information sent by any of the plurality of two-dimensional code payment systems;

the predetermined condition is at least one selected from the group of an amount on a bill, a past use date, a region of a shop used by the user, and a communication speed between the information processing system and the plurality of two-dimensional code payment apparatuses; and the authentication information transmitting circuit transmits the authentication information to the plurality of two-dimensional code payment apparatuses without establishing direct communications with the plurality of two-dimensional code payment apparatuses respectively corresponding to the plurality of two-dimensional code payment systems.

17. The information processing system according to claim 16, wherein the plurality of two-dimensional code payment systems, respectively installed on the plurality of two-dimensional code payment apparatuses, are different from each other.

18. The information processing system according to claim 16, wherein when the predetermined condition is at least the amount on the bill, the authentication information transmitting circuit transmits the authentication information to the plurality of two-dimensional code payment apparatuses based on priorities that are set based on the amount on the bill;

when the predetermined condition is at least the past use date, the authentication information transmitting circuit transmits the authentication information to the plurality of two-dimensional code payment apparatuses based on priorities that are set based on the past use date;

when the predetermined condition is at least the region of the shop used by the user, the authentication information transmitting circuit transmits the authentication information to the plurality of two-dimensional code payment apparatuses based on priorities that are set based on the region of the shop used by the user; and when the predetermined condition is at least the communication speed between the information processing system and the plurality of two-dimensional code payment apparatuses, the authentication information transmitting circuit transmits the authentication information to the plurality of two-dimensional code payment apparatuses based on priorities that are set based on the communication speed between the information processing system and the plurality of two-dimensional code payment apparatuses.

* * * * *